United States Patent
Cohan et al.

(10) Patent No.: US 9,786,023 B2
(45) Date of Patent: *Oct. 10, 2017

(54) METHODS AND SYSTEMS FOR PHARMACY LOCATION

(71) Applicant: Express Scripts, Inc., St. Louis, MO (US)

(72) Inventors: Kevin C. Cohan, Ballwin, MO (US); Alan T. Shutko, St. Louis, MO (US); Gary S. Wilcox, Ballwin, MO (US); Elizabeth T. Cole, St. Louis, MO (US)

(73) Assignee: Express Scripts, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/200,628

(22) Filed: Mar. 7, 2014

(65) Prior Publication Data
US 2014/0188505 A1   Jul. 3, 2014

Related U.S. Application Data

(63) Continuation of application No. 13/221,643, filed on Aug. 30, 2011, now Pat. No. 8,706,522.

(51) Int. Cl.
*G06Q 50/22*   (2012.01)
*G06Q 30/02*   (2012.01)
*G06Q 30/06*   (2012.01)

(52) U.S. Cl.
CPC ............ *G06Q 50/22* (2013.01); *G06Q 30/02* (2013.01); *G06Q 30/06* (2013.01); *G06Q 30/0639* (2013.01)

(58) Field of Classification Search
CPC .................................................. G06Q 50/00
USPC ............................................................ 705/2
See application file for complete search history.

(56) References Cited

U.S. PATENT DOCUMENTS

| | | |
|---|---|---|
| 2007/0250341 A1 | 10/2007 | Howe et al. |
| 2008/0059227 A1 | 3/2008 | Clapp |
| 2010/0250271 A1 | 9/2010 | Pearce et al. |

OTHER PUBLICATIONS

BCBC Website dated Jun. 5, 2009.
Aetna Website dated Jul. 29, 2010.
Nielsen, Android Soars, but iPhone Still Most Desired as Smartphone Grap 25% of U.S. Mobile Market, Nielson Wire, The Nielson Company, Aug. 2, 2010, pp. 1-3.
(Continued)

*Primary Examiner* — John Pauls
(74) *Attorney, Agent, or Firm* — Husch Blackwell LLP

(57) ABSTRACT

Methods and systems for pharmacy location are described. In one embodiment, a plurality of pharmacy network associations of a member is determined. The pharmacy network associations are associated with a drug benefit plan of the member. A pharmacy within a pharmacy network association of the plurality of pharmacy network associations is capable of fulfilling a prescription for a prescription drug. A location associated with the member is accessed. A display is generated based on the determination of the pharmacy network associations and the location of the member. The display includes a first indicator and a second indicator. A first network pharmacy of a first pharmacy network association is associated with the first indicator on the display. A second network pharmacy of a second pharmacy network association is associated with the second indicator on the display. Additional methods and systems are disclosed.

16 Claims, 21 Drawing Sheets

(56) References Cited

OTHER PUBLICATIONS

Ask, Julie and Mitchell, Chad, Case Study: Nationwide Insurance Uses Mobile to Offer Customers Self-Service on the Road, eBusiness & Channel Strategy Professionals, Forrester, pp. 1-12, Sep. 11, 2009, Cambridge, MA.
Ask, Julie with Gownder, J.P. And Wiramihardja, Laura, Creating a Mobile Services Product Road Map, A Framework for Prioritizing Proposed Mobile Services OfferinGs for Consumer Product Strategy Professionals Forrester Jul. 8, 2010 pp. 1-6.
Fowler, Seth and Ask, Julie, Engaging Smartphone Users, Why Designing Strategies for High-End Mobile Devices Makes Sense, for Consumer Product Strategy Professionals, Forrester Jan. 19, 2010 pgs. 1-8 Cambridge MA.
Ask, Julie, How to Build a Mobile Web Site, for Consumer Product Strategy Professionals, Forrester, Jun. 29, 2010, pp. 1-12, Cambridge, MA.
Walder, Bob and Girard, John, How to Secure the Corporate Data on Your iPad or iPhone, Gartner Research, pp. 1-11, Dec. 15, 2010, Stamford, CT.
Valdes, Ray, Phifer, Gene, Murphy, Jim, Knipp, Eric, Smith-Mitchell, David, Cearley, David W., Hype Cycle for Web and User Interaction Technologies, 2010 Gartner Research Jul. 23, 2010 pp. 1-90 Stamford CT.
King, Michael J., Clark, William, Jones, Nick, Magic Quadrant for Mobile Consumer Application Platforms, Gartner Research, Dec. 3, 2009, pp. 1-26, Stamford, CT.
Clark, William and King, Michael J., Magic Quadrant for Mobile Enterprise Application Platforms, Gartner Research, Dec. 16, 2009, pp. 1-29, Stamford, CT.
Ask, Julie, Mobile Internet: Where Is Your Audience? For Consumer Product Strategy Professionals, Forrester, May 6, 2009, pp. 1-11, Cambridge, MA.
Medco, What You Need to Know About Your New Pharmacy Benefit, The Segal Company, Medco Health Solutions, Inc., 2008, pp. 1-17, 2008.
Jones, Nick, Ten Mobile Technologies to Watch in 2010 and 2011, Gartner Research, Mar. 2, 2010, pp. 1-8, Stamford, CT.
Ask, Julie, The Convenience Quotient of Mobile Services: A Facebook Case Study, Consumer Product Strategy Professionals, Forrester, Oct. 14, 2009, pp. 1-12, Cambridge MA.
Ask, Julie, The Roi of Mobile, Consumer Product Strategy Professionals, Forrester, Jan. 11, 2010, pp. 1-21, Cambridge, MA.
Golvin, Charles S. and Fowler, Seth, U.S. Mobile Forecast, 2009 to 2014, Growth Will Continue Despite Looming Subscriber Saturation, for Consumer Product Strategy Professionals Forrester Nov. 6, 2009 pp. 1-8 Cambridge MA.
LeHong, Hung, Usablenet Can Extend Retail E-Commerce Site to Mobile, Gartner Industry Research, May 7, 2010, pp. 1-5, Stamford, CT.

METHODS AND SYSTEMS FOR PHARMACY LOCATION

CROSS REFERENCE TO RELATED APPLICATION

This application claims priority to and is a continuation of U.S. patent application Ser. No. 13/221,643 filed Aug. 30, 2011, entitled "METHODS AND SYSTEMS FOR PHARMACY LOCATION" said application is hereby incorporated by reference in its entirety to the extent permitted by law.

FIELD

The field relates to mobile devices, and more particularly to the use of mobile devices to identify location(s) where a prescription for a drug can be filled or a drug can be acquired.

BACKGROUND

Pharmacy benefit managers (PBMs) offer different provider network or pharmacy networks as part of a benefit plan design that includes a prescription drug benefit. These networks include the locations at which a member of a benefit plan may have a prescription for a drug filled. These locations may include retail locations, mail order locations, or both retail and mail order locations.

Some of the provider networks are vast and include most retail locations nationwide. For example, more than sixty thousand locations in the United States may be included in a vast provider network. Other provider networks are more restrictive. The restricted provider networks may include most major retail locations but avoid a major retail pharmacy chain (e.g., WALGREENS retail pharmacy locations), may be confined to certain major metropolitan areas (e.g., St. Louis, Mo. and Chicago, Ill.), or may otherwise be configured.

DETAILED DESCRIPTION

Example methods and systems for pharmacy location are described. In the following description, for purposes of explanation, numerous specific details are set forth in order to provide a thorough understanding of example embodiments. It will be evident, however, to one of ordinary skill in the art that embodiments of the invention may be practiced without these specific details.

Generally, a client engages a pharmacy benefit manager (PBM) to offer a drug benefit program. Examples of clients include governmental organizations (e.g., Federal government agencies, the Department of Defense, the Centers for Medicare and Medicaid Services and state government agencies), middle market companies, large national employers, health insurance companies that have carved out the drug benefit, and the like. The PBM may be a stand-alone PBM, or may be part of a larger organization that offers other benefits or services. The methods and systems may generally be used to guide a person who is a member of the drug benefit program offered by the client to pharmacies associated with a pharmacy network or pharmacy network association. Pharmacy networks and pharmacy network associations are interchangeably used herein.

In some embodiments, the member may be directed through a mobile electronic device or portable communication device to pharmacies that are in a restricted pharmacy network as opposed to a broad pharmacy network. Examples of these mobile electronic devices include any of a number of portable web-enabled devices (e.g., netbook computers, IPHONE devices, BLACKBERRY devices, NOKIA devices and ANDROID powered devices).

In general, pharmacies in a restricted network of a client or PBM may offer better pricing on prescription drugs to the client than the pharmacies that are not in the restricted network. However, the number of pharmacy locations in the restricted network is typically less than the number of pharmacy locations in the broad network. The co-pay paid by the member to the pharmacy may or may not be less on the basis of the member's selection of a pharmacy in the restricted network rather than selection of a pharmacy not within the restricted network.

In some embodiments, the selection of a pharmacy in a restricted network enables the client to conserve costs. Thus, the client may be able to better cope with the cost of prescription drugs, provide additional benefits to the members, provide a greater return to shareholders, or the like.

Figure 1:
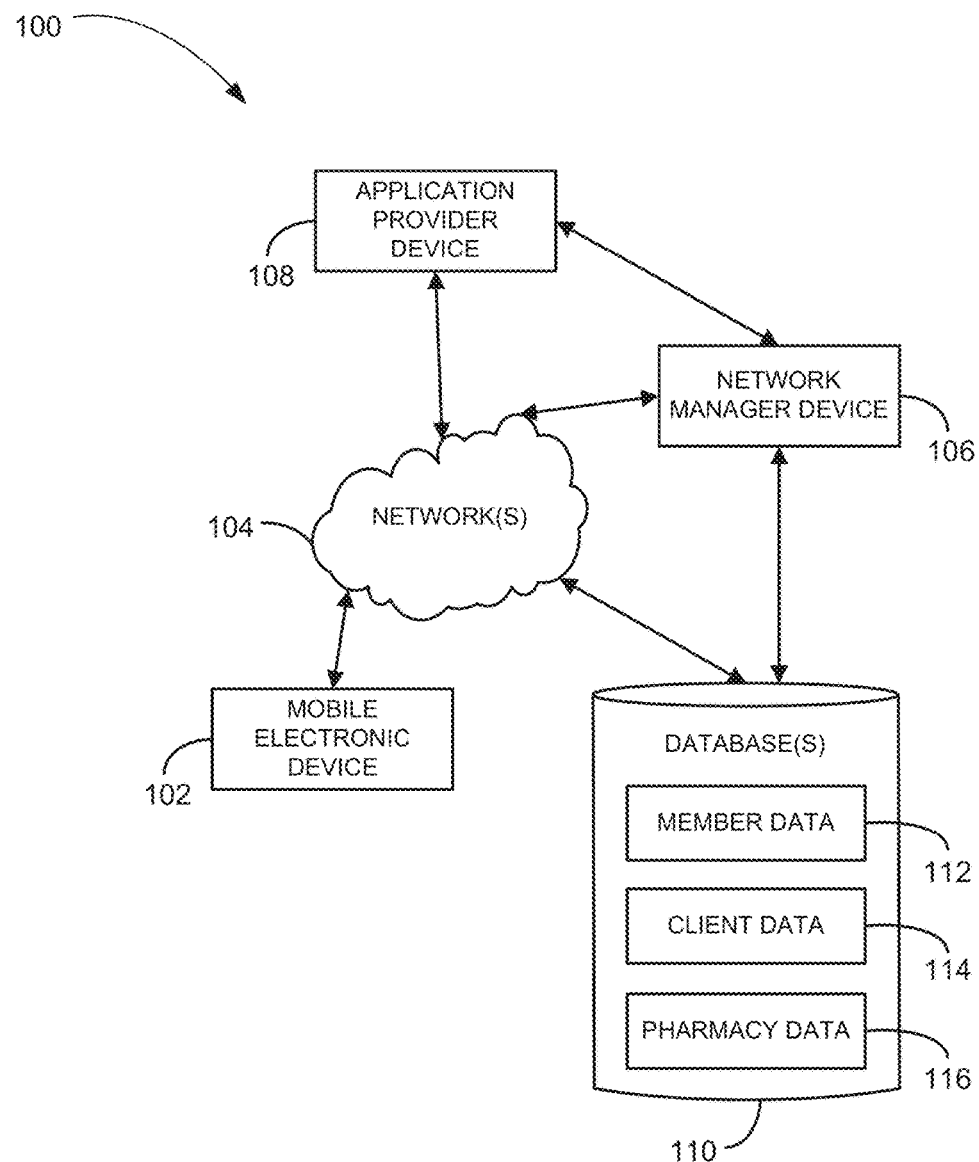
FIG. 1 is a block diagram of an example system, according to an example embodiment.

FIG. 1 is a block diagram of an example system 100, according to an example embodiment. The system 100 is an example environment in which a member, or a person assisting the member, may be directed to a pharmacy. The system 100 includes a mobile electronic device 102 in communication with a network manager device 106 over a network 104.

The mobile electronic device 102 is used by a device operator. The device operator may be a member that is either a participant in a drug benefit plan or a beneficiary of the participant (e.g., a spouse or a child of the beneficiary). However, the device operator may be another person operating the mobile electronic device 102 on behalf of the member. Examples of such people include parents, guardians and caregivers.

The mobile electronic device 102 may be a stand-alone device that solely provides at least some of the functionality to enable pharmacy location, or may be a multi-use device that has functionality outside of pharmacy location as described herein. Examples of the mobile electronic device 102 include an IPHONE device by Apple, Inc., mobile electronic devices powered by ANDROID by Google, Inc., and a BLACKBERRY device by Research In Motion Limited. Other types of mobile electronic devices may also be used. These can include, but are not limited to, portable computing devices and portable communication devices.

The network 104 by which the mobile electronic device 102 communicates with the network manager device 106 may include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Network 104 may also include optical communications. Other conventional and/or later developed wired and wireless networks may also be used.

The network manager device 106 is a device operated by an entity at least partially responsible for creation and/or management of the pharmacy networks. While the network manager operating the network manager device 106 is typically a PBM, other entities may operate the network manager device 106 either on behalf of themselves, the PBM, or another entity.

Some of the operations of the PBM that operates the network manager device 106 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The pharmacy then submits a claim to the PBM. The PBM performs certain adjudication functions including verifying the eligibility of the member, reviewing the formulary to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated.

The ultimate amount of reimbursement paid to the pharmacy by the client and/or member may be based at least in part on the type of pharmacy network in which the pharmacy is included. Other factors may be used to determine the reimbursement amount in addition to type of pharmacy network. If the pharmacy is in a restricted network in which a lesser number of pharmacies are available to the member, the pharmacy may receive a lower amount of reimbursement for the prescription drug. If the pharmacy is not in the restricted network but rather is in a less restrictive network in which a greater number of pharmacies are available to the member, the pharmacy may receive a greater amount of reimbursement. Thus, a pharmacy may be deemed a preferred pharmacy when the pharmacy is within the restricted network of a client and may be deemed a non-preferred pharmacy when the pharmacy is not within the restricted network. Pharmacies may choose to be in or bid into a restricted network to obtain a greater market share of the claims for prescription drugs from certain clients and/or PBMs.

In some embodiments, a mobile application or app may be downloaded, installed, and launched on the mobile electronic device 102 to enable the device operator to access the pharmacy location functionality. The mobile application may take advantage of hardware and/or software functionality provided by manufacturers of the mobile electronic device 102 and/or developers of the operating system of the mobile electronic device 102. For example, the mobile application may use the SAFARI web browser on the IPHONE device, the webkit browser on an ANDROID device, MOBILE INTERNET EXPLORER on a WINDOWS MOBILE device, or mapping functionality on any of the aforementioned devices. The mobile application may include instructions that when executed on the mobile electronic device 102 or in the network manager device 106 cause a machine to change its state or perform tasks within the machine and with other machines.

The mobile application may be downloaded from an application provider device 108 or directly from the network manager device 106. In general, the application provider device 108 is an entity that makes available mobile applications created by the application provider and/or third parties (e.g., the network manager) for download and use on mobile electronic devices. Examples of companies that operate the application provider device 108 include Apple, Inc. through its operation of ITUNES STORE, Google, Inc. through its operation of ANDROID MARKET, AT&T through its operation of its APPCENTER, and Research In Motion Limited through its operation of BLACKBERRY APP WORLD. Each of these application provider device companies can host and supply proprietary apps, open apps, and apps by third parties.

The mobile electronic device 102 may be in a client-server relationship with the network manager device 106 and/or the application provider device 108, a peer-to-peer relationship with the network manager device 106 and/or the application provider device 108, or in a different type of relationship with the network manager device 106 and/or the application provider device 108.

The network manager device 106 may be in communication directly (e.g., through local storage) and/or through the network 104 (e.g., in a cloud configuration or software as a service) with a database 110. The database 110 may store member data 112, client data 114, and/or pharmacy data 116.

The member data 112 includes information regarding the members associated with the network manager. Examples of the member data 112 include name, address, telephone number, e-mail address, prescription drug history, and the like. The member data 112 may include a client identifier that identifies the client associated with the member and/or a member identifier that identifies the member to the client.

The client data 114 includes information regarding the clients of the network manager. Examples of the client data 114 include company name, company address, contact name, contact telephone number, contact e-mail address, and the like.

The pharmacy data 116 includes information regarding pharmacies. The pharmacy data 116 may include, by way of example, location data regarding the location of the pharmacies, information data regarding the pharmacy hours and/or telephone number, pharmacy network association data defining the pharmacy network associations of which the pharmacies are associated, and the like.

In some embodiments, the member may be directed through the mobile electronic device 102 to preferred pharmacy locations or away from non-preferred pharmacy locations within a pharmacy network association. The pharmacy locations may be designated preferred or non-preferred by the client, the network manager, a combination of the client and the network manager, or another entity. The designation may be on the basis of better or worse pricing relative to other pharmacies in other pharmacy networks, the pending or potential removal of pharmacies from the pharmacy network, or another basis. Examples of another basis can include traffic information near the pharmacy and availability of the prescribed drug.

While the system 100 in FIG. 1 is shown to include single devices 102, 106, 108, multiple devices may be used. The devices 102, 106, 108 may be the same type of device or may be different device types. When multiple devices are present, the multiple devices may be of the same device type or may be a different device type. Moreover, system 100 shows a single network 104, however, multiple networks can be used. The multiple networks may communicate in series with each other to link the devices 102, 106, 108 or in parallel to link the devices 102, 106, 108.

In some embodiments, at least some of the functionality of the application provider device 108 may be included in the network manager device 106. In such embodiments, the application may be downloadable directly from the network manager device 106 or at direction of the network manager device 106 from the database 110, which may store the application.

Figure 2:
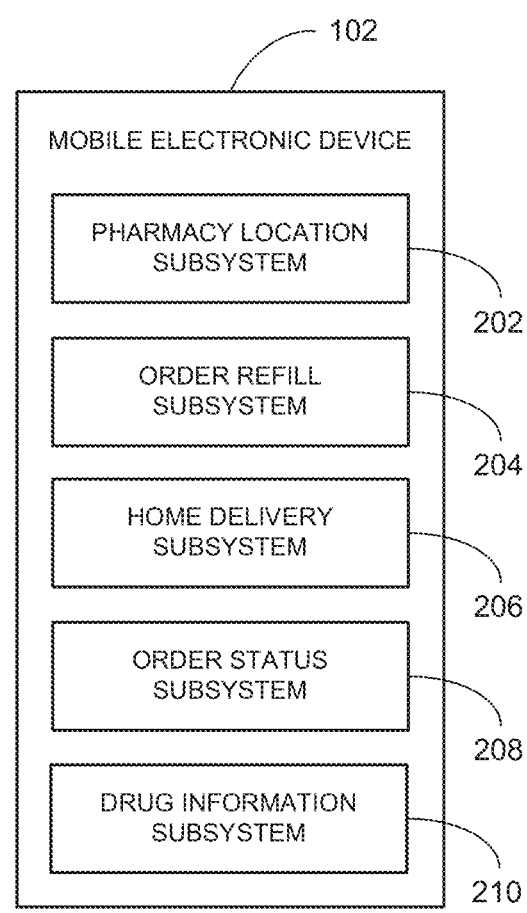
FIG. 2 is a block diagram of an example mobile electronic device that may be deployed within the system of FIG. 1, according to an example embodiment.

FIG. 2 illustrates the mobile electronic device 102, according to an example embodiment. The mobile electronic device 102 may be used by a device operator to locate a pharmacy or other source of a drug. The mobile electronic device 102 may be deployed in the system 100, or may otherwise be used.

The mobile electronic device 102 may include a pharmacy location subsystem 202, an order refill subsystem 204, a home delivery subsystem 206, an order status subsystem 208, and/or a drug information subsystem 210.

The pharmacy location subsystem 202 enables the device operator of the mobile electronic device 102 to locate a nearby pharmacy. Examples of nearby pharmacies include the physically closest pharmacies, pharmacies within a certain distance that have the shortest drive time from the current location of the mobile electronic device 102, a pharmacy with a shortest wait time for prescription fulfillment, or combinations thereof. The order refill subsystem 204 may enable the device operator to obtain refills for prescription drugs. The home delivery subsystem 206 may enable the device operator to start home delivery service for prescription drugs.

The order status subsystem 208 enables the device operator to check the status of orders for prescription drugs. The drug information subsystem 210 enables the device operator to obtain drug information about prescription drugs.

Figure 3:
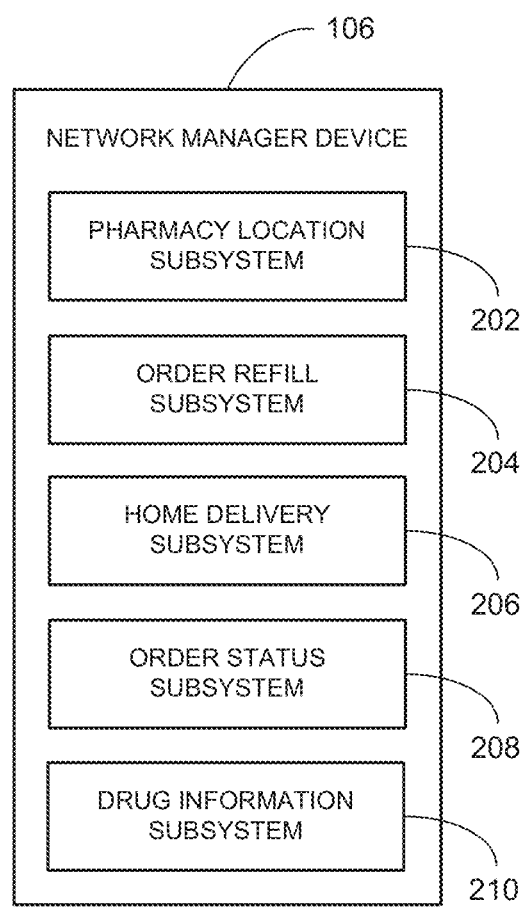
FIG. 3 is a block diagram of an example network manager device that may be deployed within the system of FIG. 1, according to an example embodiment.

FIG. 3 illustrates the network manager device 106, according to an example embodiment. The network manager device 106 may be deployed in the system 100, or may otherwise be used.

The network manager device 106 may include the pharmacy location subsystem 202, the order refill subsystem 204, the home delivery subsystem 206, the order status subsystem 208, and/or the drug information subsystem 210. In some embodiments, one or more of the various subsystems 202-210 when used may provide server-side functionality to the mobile electronic device 102. By way of example, the pharmacy location subsystem 202 may be deployed in both the mobile electronic device 102 and the network manager device 106. The mobile electronic device 102 may then perform some of the functionality while other functionality is performed by the network manager device 106.

Figure 4:
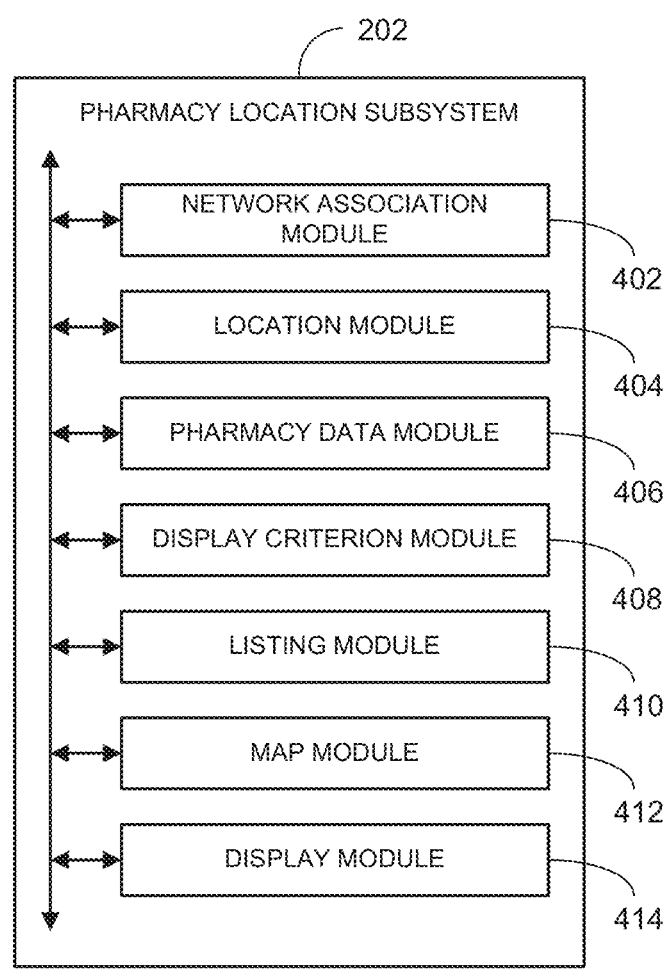
FIG. 4 is a block diagram of an example pharmacy location subsystem that may be deployed within the mobile electronic device of FIG. 2 or the network manager device of FIG. 3, according to an example embodiment.

FIG. 4 illustrates an example pharmacy location subsystem 202 that may be deployed in the mobile electronic device 102, the network manager device 106, or otherwise deployed in another system. One or more modules are communicatively coupled and included in the pharmacy location subsystem 202 to enable pharmacy location. The modules of the pharmacy location subsystem 202 that may be included are a network association module 402, a location module 404, a pharmacy data module 406, a display criterion module 408, a listing module 410, a map module 412, and/or a display generation module 414. Other modules may also be included.

In some embodiments, the modules of the pharmacy location subsystem 202 may be distributed so that some of the modules are deployed in the mobile electronic device 102 and some modules are deployed in the network manager device 106. In one embodiment, the modules are deployed in memory and executed by a processor coupled to the memory. The functionality contained within the modules 402-414 may be combined into a lesser number of modules, further divided among a greater number of modules, or redistributed among existing modules. Other configurations including the functionality of the modules 402-414 may be used.

Pharmacy networks or pharmacy network associations of the member are determined by the pharmacy location subsystem 202. Pharmacy networks or pharmacy network associations include the pharmacy locations, pharmacy organizations, or both the pharmacy locations and the pharmacy organizations in which the member may be reimbursed for filling prescription drugs.

The pharmacy network associations are generally defined by the drug benefit plan of the member. The member may have a single pharmacy network or multiple pharmacy networks. When multiple pharmacy networks are included in the drug benefit plan of the member, some of the pharmacies may be preferred pharmacies that provide the prescription drugs at a lower cost to the member and/or the client associated with the member, while other pharmacies are non-preferred pharmacies that may provide the prescription drugs at a higher cost to the member and/or the client.

The determination of the pharmacy network association(s) of the member may be determined, in some embodiments, by the network association module 402 receiving identification of pharmacy network associations of the member. The identification may be received by the mobile electronic device 102 from the network manager device 106, or may otherwise be received. The receipt of the identification may be in response to transmission of a pharmacy network association identification request by the mobile electronic device 102 to the network manager device 106.

In some embodiments, the network association module 402 determines pharmacy network associations by identifying the member, identifying the client associated with the member, and determining the pharmacy network associations of the client. The member may be identified by comparing received information from the device operator against the member data 112. The client may be identified by comparing the received information and/or the member data 112 against the client data 114. The pharmacy network associations of the client may be determined by parsing matching portions of the client data 114 to identify pharmacies locations or pharmacy organizations within the pharmacy network association.

The network association module 402, in some embodiments, determines pharmacy network associations by determining the drug benefit plan associated with the member through accessing the member data 112 and/or the client data 114. The drug benefit plan may then define pharmacy network associations of the client.

The location associated with the member is accessed or obtained by the location module 404. The location as accessed may be of the mobile electronic device 102, where the member is located or perceived to be location, where a non-member device operator is located or perceived to be located, or otherwise. The location may also be a typical location for the member, e.g., home, business, club, workout facility, or the like. The location may be identified in terms of street address, latitude and longitude coordinates, another type of geographic location identifier, or otherwise.

The location may be accessed by receiving identification of the location associated with the member. For example, the network manager device 106, the application provider device 108, or another device may transmit an actual or perceived location of the device operator (e.g., member or non-member device operator that is operating the mobile electronic device 102).

The location may be accessed by determining the location associated with the member. The location module 404 may include or communicate with a Global Positioning System (GPS) receiver, an accelerometer, and/or other types of software and/or hardware to determine location of the mobile electronic device 102.

The location module 404 may access the location in real time or at a delay. The accessed location may also be a perceived location associated with the member based on or using a travel route with the device operator that is operating the mobile electronic device 102.

In some embodiments, the location may be accessed via an authorization request received from a pharmacy. For example, if the member should present a health savings account or insurance card during a purchase or attempted purchase, the pharmacy may transmit an authorization request to the network manager device 106. The network manager device 106 identify the location of the pharmacy and transmit information to the mobile electronic device 102 that indicates or may be used to determine the current location of the device operator that is operating the mobile electronic device 102.

The location of the device operator may also be based upon a hierarchical process wherein a real time location is selected first. If a real time location is not available, then the last known location of the device operator may be selected. Finally, if a real time or recent location of the device operator cannot be determined, the location module 404 may select a home location of the member.

The pharmacy data module 406 receives the pharmacy data 116. The pharmacy data 116 for all pharmacies, all pharmacies in pharmacy network associations of the client, all pharmacies in a particular network association, all pharmacies in pharmacy network associations of the client within a particular geographic area or within a particular geographic range from a starting point, or otherwise may be received. Geographic areas can be defined by distance from the location, e.g., one mile, less than 5 miles, less than 10 miles, less than 25 miles, etc. or by driving time from the location, e.g., less than 5 minutes, less than 10 minutes, less than 30 minutes, less than one hour, etc.

The pharmacy data 116 may be received periodically by the pharmacy data module 406 on the mobile electronic device 102 from the network manager device 106, based on or using a specific request sent to the network manager device 106, or otherwise. By way of example, the pharmacy data module 406 may transmit a pharmacy network association request from the mobile electronic device 102 to the network manager device 106. The pharmacy network association request may be based on or use the pharmacy network associations and/or the location associated with the member. The pharmacy data 116 may then be received by the mobile electronic device 102 from the network manager device 106.

The display ultimately presented to the device operator may be configured based on or using a pharmacy network display criterion accessed by the display criterion module 408. The network display criterion may include business logic that defines what or how information is presented on the display. A single network display criterion or multiple network display criterion may be accessed and used by the pharmacy location subsystem 202. In some embodiments, the client data 114 includes the pharmacy network display criterion.

In some embodiments, the pharmacy network display criterion may include identification of a network manager preferred pharmacy, a network manager non-preferred pharmacy, a network manager preferred pharmacy organization or pharmacy chain, and/or a network manager non-preferred pharmacy organization. In some embodiments, the pharmacy network display criterion may include identification of a client preferred pharmacy, a client non-preferred pharmacy, a client preferred pharmacy organization, a client non-preferred pharmacy organization, or combinations thereof. A single or multiple pharmacy and/or organization may be included in the pharmacy network display criterion.

When pharmacies and/or pharmacy organizations are included in pharmacy network display criterion, the display generated may reflect such inclusion. For example, the display may designate certain pharmacies as being preferred or non-preferred, may organize pharmacies on a pharmacy list on the display based on being preferred or non-preferred pharmacies, or may exclude certain pharmacies from the display based on being preferred or non-preferred pharmacies.

The pharmacy network display criterion may include a distance rule. In general, the distance rule defines a pharmacy existence guarantee between a client and a PBM. For example, the distance rule may implement the PBM's guarantee to a client that a pharmacy be located within a certain distance (e.g., 5 miles) from its members, the client, or both. When a distance rule is included in the pharmacy network display criterion the display generated may reflect such inclusion. For example, only non-preferred pharmacies that are in a member's area where a preferred pharmacy is located may be included on a display based on the distance rule.

Based on at least the location associated with the member, the listing module 410 generates and/or receives a pharmacy list. In general, the pharmacy list identifies a number of pharmacies that are in the vicinity of the member. The pharmacies may be listed by name, address, and phone number. However, the pharmacies may otherwise be listed with more or less information.

The pharmacies on the pharmacy list may be sorted or ordered. In some embodiments, the pharmacies are at least partially ordered based on distance between the location of the member and the nearest pharmacies. The distance may be driving distance, point to point distance, driving time, or otherwise. In some embodiments, the pharmacies are at least partially ordered based on whether the pharmacies are preferred or non-preferred pharmacies. In some embodiments, the pharmacies may be sorted in a hierarchical order with the pharmacy providing the greatest discount listed as the preferred drug provider.

The listing module 410 may determine the number of preferred pharmacies within a certain distance (e.g., 5 miles)

from the location of the user. For example, if the number of preferred pharmacies exceed a threshold value as defined by the pharmacy network display criterion, then only the preferred pharmacies will be included (e.g., displayed) on the pharmacy listing.

Based on at least the location associated with the member, the map module 412 generates and/or receives a map. In general, the map is a graphical representation of a geographic area that identifies a number of pharmacies that are in the vicinity of the member. The pharmacies may be indicated on the map by identifiers.

In some embodiments, the map module 412 may determine the number of preferred pharmacies within a certain distance (e.g., 5 miles) from the location associated with the member. If the number of preferred pharmacies exceeds a threshold value as defined by the pharmacy network display criterion, then only preferred pharmacies will be included and ultimately displayed on the map.

The map module 412 may adjust the geographic area to include a predetermined number of pharmacies. The predetermined number may be based on the pharmacy network display criterion, determined by and received from the client, determined by and received from the network manager, determined by the manufacturer of the mobile electronic device 102, or otherwise predetermined.

In some embodiments, the map module 412 may adjust the size of the geographic area of the map to be displayed based upon the number of pharmacies detected in the area surrounding the device operator. For example, the map module 412 may operate to iteratively expand the size of the geographic area of the map until some predetermined minimum number of pharmacies (e.g., as may be defined by the pharmacy network display criterion) are included within the confines of the map. In this situation, the device operator in a city may ultimately be presented with a display that includes map of a much smaller area (e.g., only a few blocks) because a city environment may have many pharmacies geographically close to the device operator while in an urban environment, the map may be of a much larger area (of many miles) in order to display a certain number of available pharmacies.

In some embodiments, the map or pharmacy list may display pharmacies that are not members of any pharmacy network organization of the member. These pharmacies may be designated as non-participating pharmacies (e.g., through an indicator) on the pharmacy listing and/or the map or otherwise.

The display generation module 414 generates a display. In general, the display or screen is a computer generated image or series of images capable of being viewed by a person when presented on a device. The display is generally graphically rendered and presented to a device operator on a display device unit (e.g., a television screen, a computer monitor, or a mobile device electronic display) of the device.

The generation of the display by the display generation module 414 is based on the determination of the pharmacy network associations and the location of the member. In some embodiments, generation of the display is based on at least a part of the pharmacy data 116, the plurality of pharmacy network associations of the member, and the location of the member. In some embodiments, generation of the display is further based on the pharmacy network display criterion.

The display may include a pharmacy list, a map, or both a pharmacy list and a map. When included, the pharmacy list and/or the map may be depicted on the display. In some embodiments, the map and/or the pharmacy list may be generated as part of the display by the display module 414. The functionality of the listing module 410 and/or map module 412 may be incorporated in the display module 414, or the listing module 410 and/or map module 412 may be in communication with the display module 414 to generate the map and/or the pharmacy list as part of the display.

Indicators may be included on the pharmacy list, the map, or both the pharmacy list and the map and may be included in such depictions. Indicators include graphical representations of a pharmacy location. When included on a pharmacy list, the graphical representation may include a color or other designator to indicate whether the pharmacy is a preferred or non-preferred pharmacy. By way of example, the locations of pharmacies of preferred pharmacy network associations may be depicted as indicators with a green color. The locations of pharmacies of non-preferred pharmacy network associations may be depicted as stickpins with a red color. In another example, locations of pharmacies of preferred pharmacy network associations may be depicted with indicators larger than indicators for locations of pharmacies of non-preferred pharmacy network.

The display module 414 and/or the map module 412 may include a current locator indicator. The current locator indicator may reflect the location associated with the member based on the location accessed by the location module 404.

In some embodiments, the pharmacies of a non-preferred pharmacy network association, in some embodiments, may not be included on the display unless no pharmacies that meet the pharmacy network display criterion are available in the first pharmacy network association.

Figure 5:
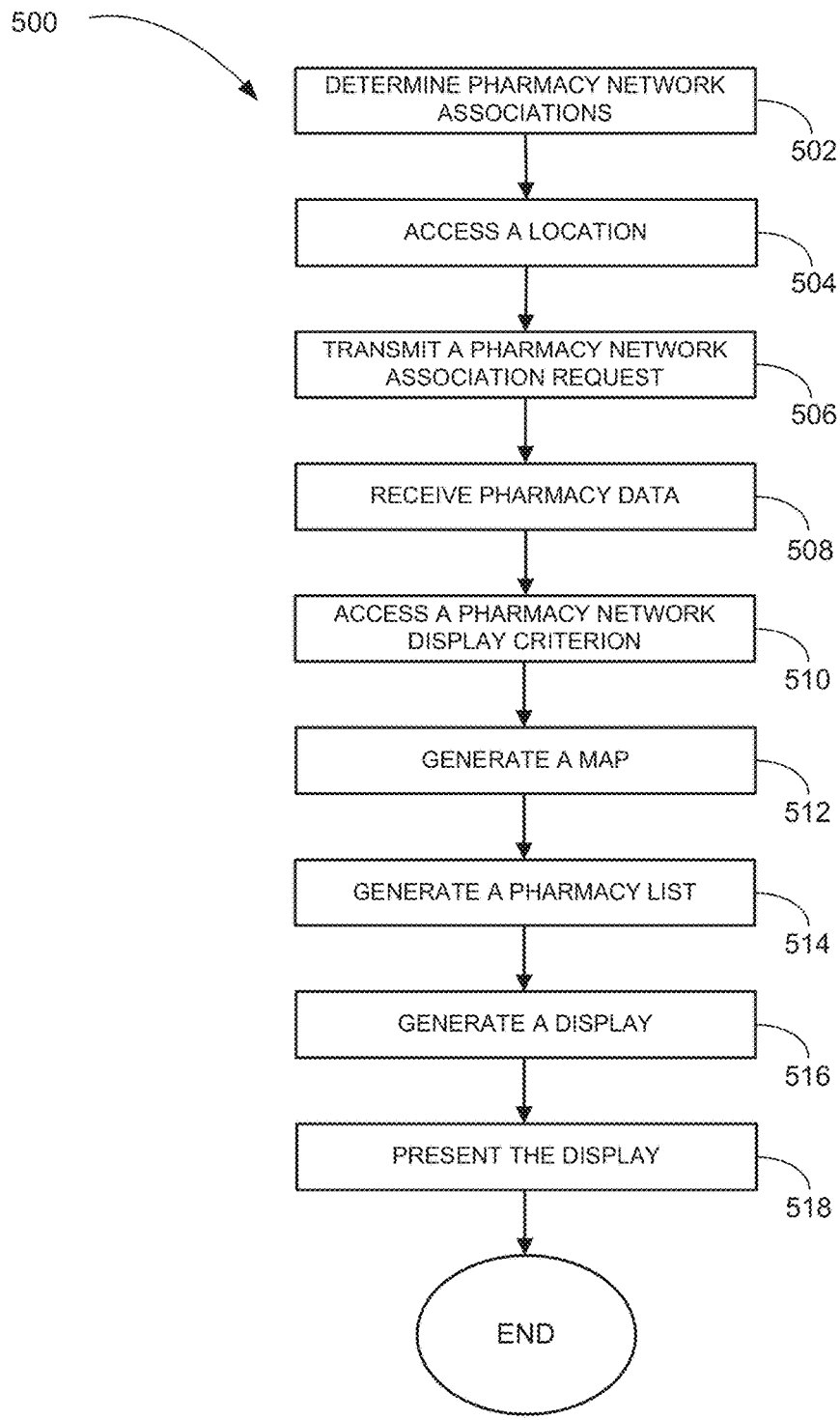
FIGS. 5 and 6 are block diagrams of flowcharts illustrating methods for display generation, according to an example embodiment.

FIG. 5 illustrates a method 500 for display generation according to an example embodiment. The method 500 may be performed by the mobile electronic device 102, partially by the mobile electronic device 102 and partially by the network manager device 106, or may be otherwise performed.

Pharmacy network associations of the member are determined at block 502. The pharmacy network associations are associated with a drug benefit plan of the member. In general, a pharmacy within a pharmacy network association pharmacy network association is capable of fulfilling a prescription for a prescription drug.

In some embodiments, a determination of the drug benefit plan associated with the member is made and the pharmacy network associations of the member are based on the drug benefit plan of the member.

In some embodiments, the determination includes identifying the member, identifying the client associated with the member, and determining the pharmacy network associations of the client.

A location associated with the member is accessed at block 504. In some embodiments, accessing the location includes receiving identification of the location associated with the member. In some embodiments, accessing the location comprises determining the location associated with the member. In some embodiments, accessing the location includes accessing location information associated with the mobile electronic device 102 to determine the location of the member. In some embodiments, accessing the location includes determining location information associated with the mobile electronic device 102 to determine the location of the member.

A pharmacy network association request may be transmitted at block 506. The pharmacy network association request may be based on the pharmacy network associations and/or the location associated with the member.

The pharmacy data 116 may be received at block 508. The received pharmacy data 116 may include location data regard the pharmacy network associations. The receipt of the pharmacy data may be in response to transmission of the pharmacy network association request. A pharmacy network display criterion may be accessed at block 510.

A map may be generated at block 512. The map may be generated on the mobile electronic device 102, or generated on another device and transmitted to the mobile electronic device 102.

A pharmacy list may be generated at block 514 based on the location of the member. The pharmacy list may be generated on the mobile electronic device 102, or generated on another device and transmitted to the mobile electronic device 102.

In some embodiments, the pharmacy list may include the closest pharmacy to the device operator shown first, the next closest shown next, and so on.

In some embodiments, the pharmacy list may include the closest pharmacy to the device operator in the preferred network shown first and the next closest in the preferred network shown next and so on. Once a number of preferred pharmacies are shown, the closest pharmacy to the device operator in the non-preferred network shown first, the next closest in the non-preferred network shown next, and so on. Closest can be determined based on point-to-point, driving distance, driving time, or the like.

In some embodiments, the status of the various pharmacies as being preferred or non-preferred may also be included on the pharmacy list as a colored dot in conjunction with the pharmacy.

A display is generated at block 516. The display may be generated based on the determination of the pharmacy network associations and the location of the member. In some embodiments, generation of the display is based on at least a part of the pharmacy data 116, the pharmacy network associations of the member, and the location associated with the member.

Generation of the display may be based on the pharmacy network display criterion, the determination of the pharmacy network associations, and the location of the member.

The generated display may include a single indicator or multiple indicators. For example, a first network pharmacy of a first pharmacy network association may be associated with the first indicator on the display, and a second network pharmacy of a second pharmacy network association being associated with the second indicator on the display, the first indicator being a different indicator than the second indicator. In some embodiments, the display may include a current locator indicator that indicates the location associated with the member.

The first indicator may be a first color (e.g., green) and a second indicator may be a second, different color (e.g., red). When included, the current locator indicator may be a third, different color (e.g., blue). Other types of different indicators including different shapes or sizes may also be used.

In some embodiments, the first pharmacy network is a preferred pharmacy network of the pharmacy network associations and the second pharmacy network is a non-preferred pharmacy network of the pharmacy network associations.

In some embodiments, first network pharmacy is in the preferred pharmacy network and the second network pharmacy is in the non-preferred pharmacy network and is not in the preferred pharmacy network.

The display may be presented at block 518. The display may include the map, the pharmacy list, or both the map and the pharmacy list. A single indicator or multiple indicators may be included on the map, a pharmacy list, both the map and the pharmacy list, or otherwise on the display.

By way of example, the locations of pharmacies of the pharmacy network associations as received by the pharmacy data 116 may be sorted through based upon the determined location of the device operator. In generation of the map, the pharmacy list, and/or other elements of the display, a distance of the various pharmacies from the location of the device operator may be made (during operations performed at blocks 512, 514, 516 respectively). Upon accessing the pharmacy network display criterion at block 510, pharmacies within a distance (e.g., 1 mile, 5 miles, etc.) defined by the pharmacy network display criterion are identified. The map may be generated at block 512. The map, when included with the display generated at block 516, may include the location of the device operator in the center of the map and the locations of preferred and non-preferred pharmacies shown in their respective locations on the map around the device operator. The display may then be presented to the device operator at block 518.

Figure 6:
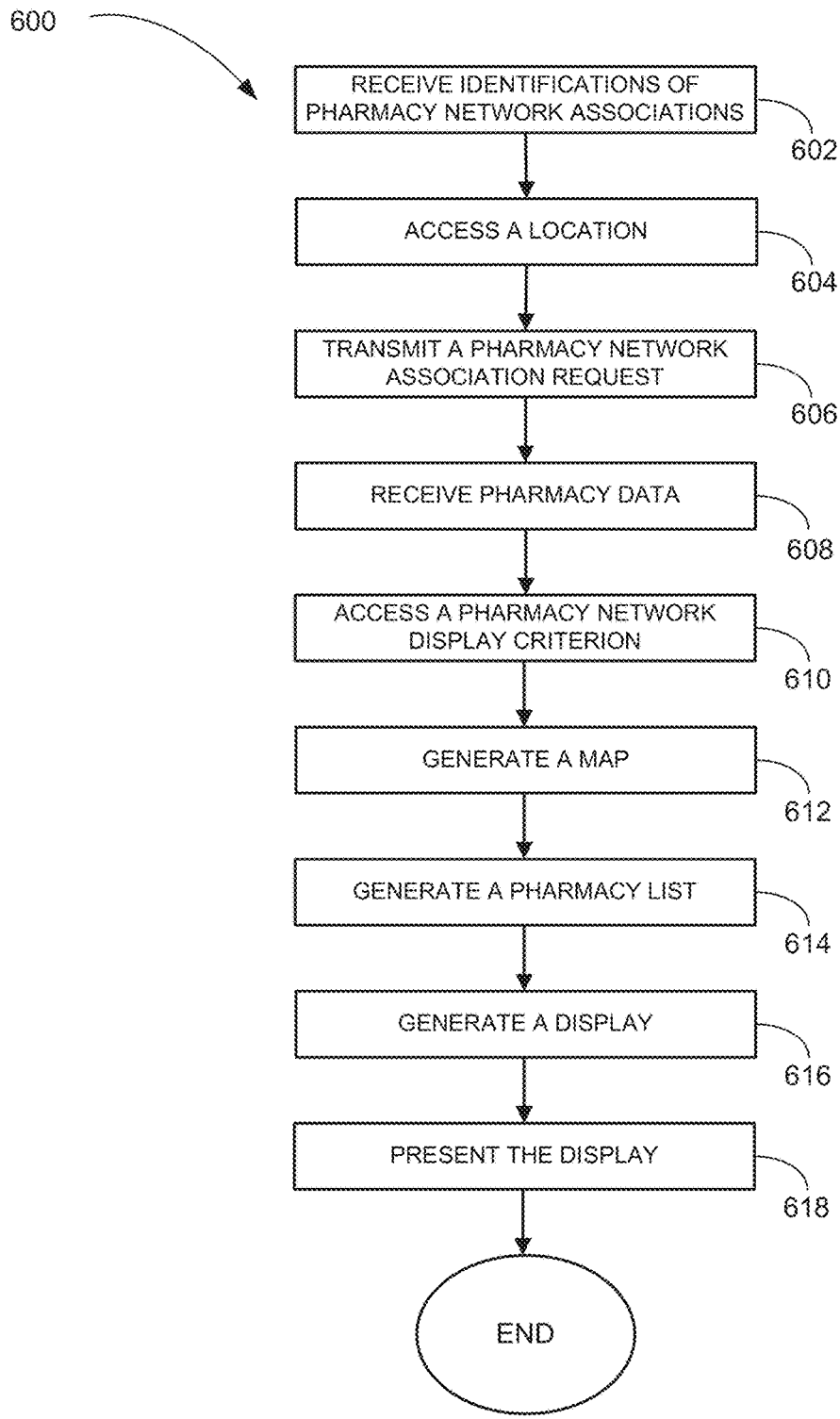

FIG. 6 illustrates a method 600 for display generation according to an example embodiment. The method 600 may be performed by the mobile electronic device 102, partially by the mobile electronic device 102 and partially by the network manager device 106 and/or the application provider device 108, or may be otherwise performed.

Identification of pharmacy network associations of a member is received at block 602.

A location associated with the member is accessed at block 604.

A pharmacy network association request may be transmitted at block 606. The pharmacy network association request may be based on the pharmacy network associations and/or the location associated with the member. The pharmacy network association request may be transmitted to the network manager device 106, or may otherwise be transmitted.

The pharmacy data 116 may be received at block 608. The received pharmacy data 116 may include location data regard the pharmacy network associations. The receipt of the pharmacy data may be in response to transmission of the pharmacy network association request.

A pharmacy network display criterion may be accessed at block 610. A map may be generated at block 612. The map may be generated on the mobile electronic device 102, or generated on another device and transmitted to the mobile electronic device 102. A pharmacy list may be generated at block 614 based on the location of the member. The pharmacy list may be generated on the mobile electronic device 102, or generated on another device and transmitted to the mobile electronic device 102.

A display is generated at block 616. The display may be generated based on receipt of the identification of pharmacy network associations and the location of the member. In some embodiments, generation of the display is based on at least a part of the pharmacy data, the pharmacy network associations of the member, and the location of the member.

Generation of the display may be based on the pharmacy network display criterion, the receipt of identification of pharmacy network associations, and the location of the member. The generated display may include a single indicator or multiple indicators.

The display may include the map, the pharmacy list, or both the map and the pharmacy list. A single indicator or multiple indicators may be included on the map, a pharmacy list, both the map and the pharmacy list, or otherwise on the display.

The display may be presented at block 618.

FIGS. 7-20 are example displays 700-2000, according to example embodiments. The displays 700-2000 include example data and may be generated by the pharmacy location subsystem 202 and ultimately presented to an operator of the mobile electronic device 102. However, other types of displays and modification to the displays 700-2000 may additionally or alternatively be presented.

In some embodiments, the display 700-2000 may be optimized to have a maximum size of 20K. However, other sizes or even un-optimized displays may be used.

Figure 7:
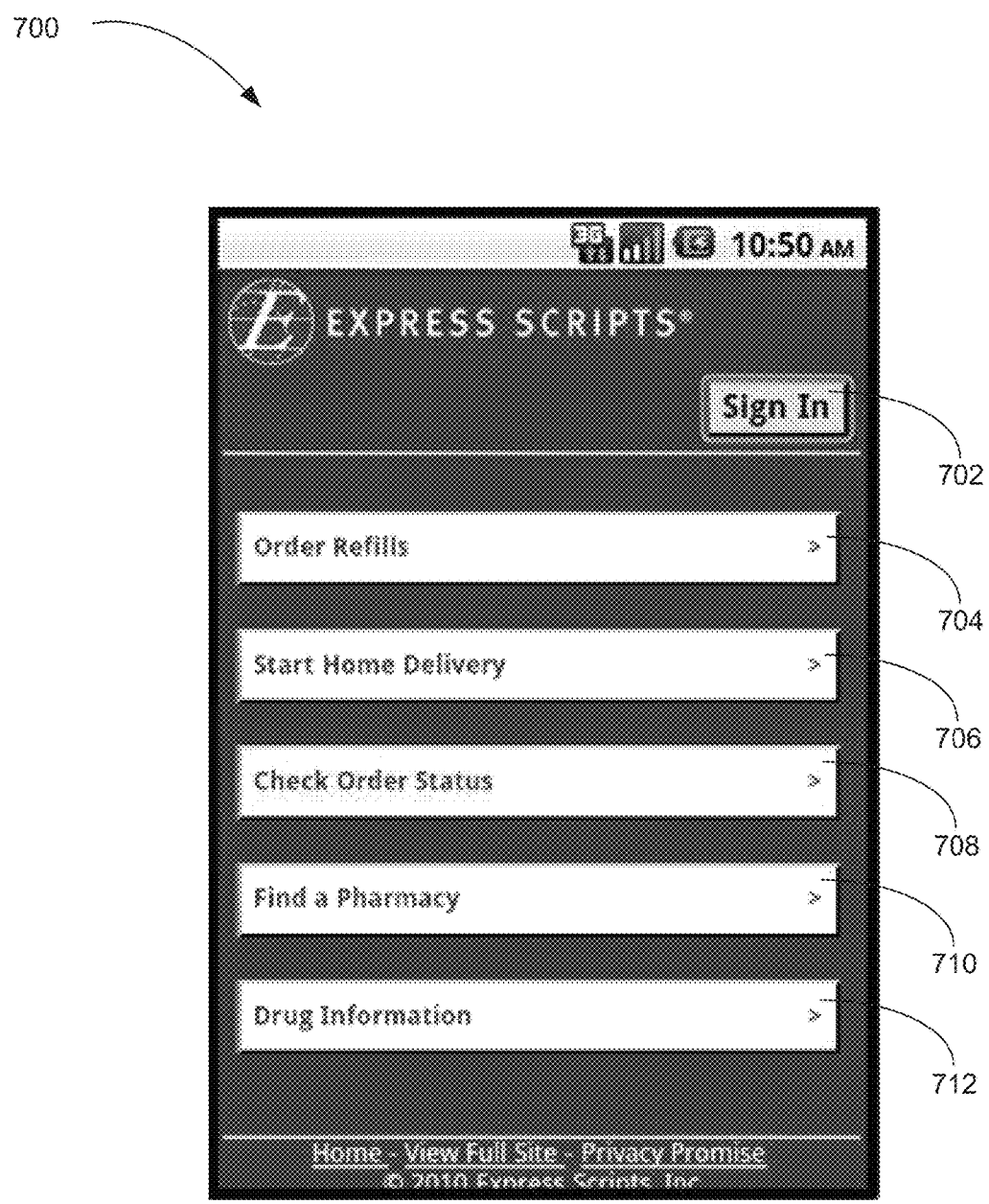
FIGS. 7-20 are example displays, according to example embodiments.

The display 700 of FIG. 7 is an example of a general menu display that may be presented to the device operator of the mobile electronic device 102 when an application that incorporates at least a part of the functionality of the subsystems 202-210 (see FIG. 2) is first launched. As shown in the display 700, the device operator is invited to sign-in to a user account through a sign-in button 702. Once selected (e.g., pressed, clicked on, etc.), the user may be presented with a sign-in display. In some embodiments, the device operator may be already or automatically signed-in upon launch through another authentication method, a previous usage session, or the like.

The device operator is presented with a number of additional buttons 704-712 on the display 700. The buttons 704-712, when selected, either launch a further display associated with the functionality of the selected button, or may first take the device operator to a sign-in display prior to providing the display desired by the device operator. In one embodiment, the device operator must first be signed in before accessing the functionality of further displays generated by selection of buttons 704-710 but may access the functionality of a further display generated by selection of button 712 without signing in.

Figure 8:
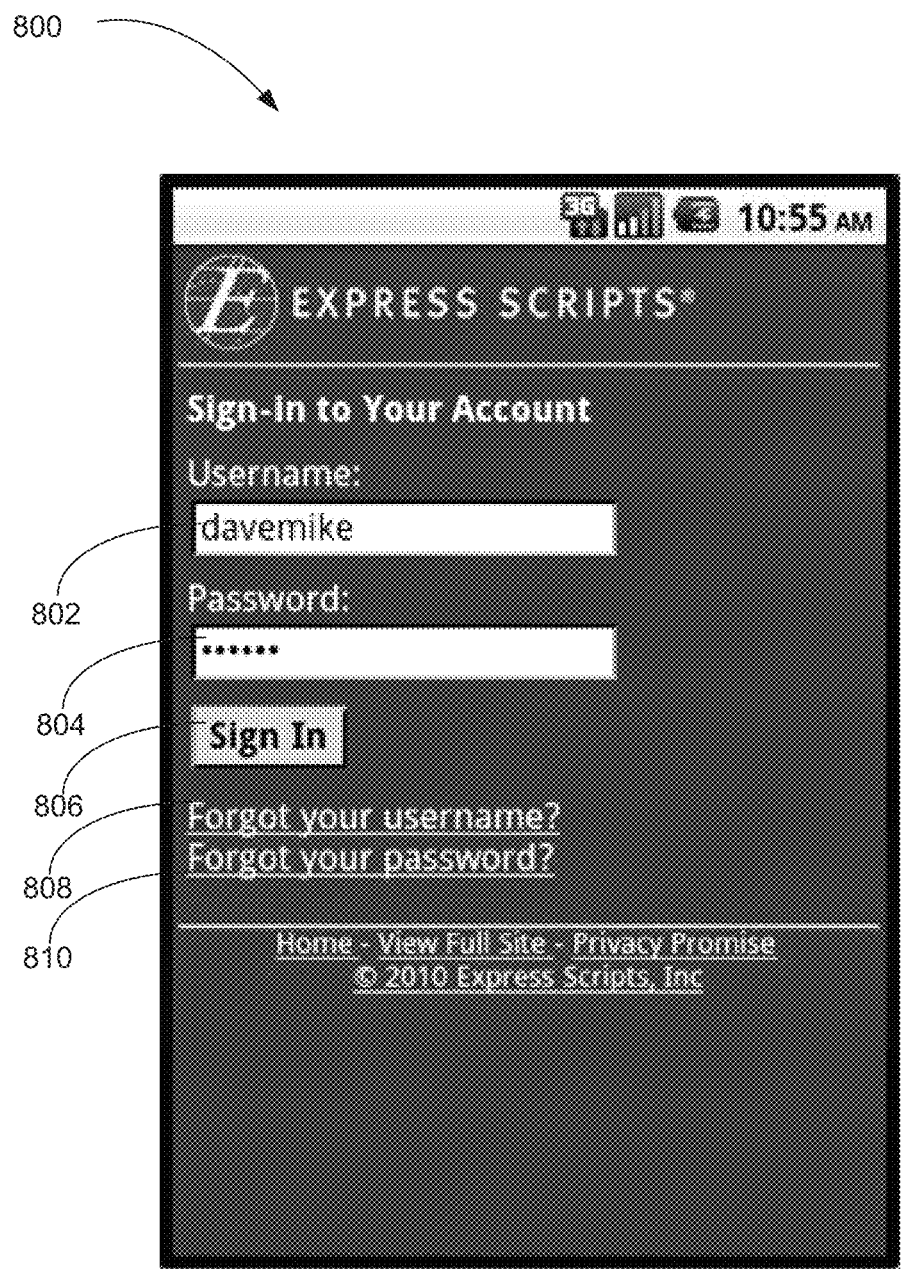

An example sign-in display that may be launched is a display 800 of FIG. 8. The display 800 may be presented upon selection of the sign-in button 702 as described above, or may otherwise be presented.

The display 800 includes a user name field 802 and a password field 804 to receive the user name and password respectively from the device operator. The user name and password may be the device operator's own user name and password when the device operator is a member of may be the member's user name and password. Once completed, the device operator may select a sign-in button 806 to sign into the account of the member. If the device operator cannot remember a user name or password, the device operator can select forgot username link 808 or forgot password link 810. The forgot username link 808 provides a further display that includes a field to receive an e-mail address to which the user name associated with the e-mail address will be sent. The forgot password link 810 provides a further display that includes a field to receive a user name to which the device operator is prompted to provide a new password.

In some embodiments, the device operator may be prompted to save sign in credentials. When the application is re-launched, the device operator may not be requested to sign-in again to his/her account but rather may again be provided with access to the last account accessed. In some embodiments, other sign-in credentials instead of or in addition to user name and password may be used.

In some embodiments, the member associated within the account may have multiple prescription drug coverage by being subject to more than one prescription drug benefit plan. After sign-in, the device operator may, in some embodiments, select which coverage to view. In other embodiments, the coverage from multiple prescription drug coverage may be merged into a single view for the device operator.

Figure 9:

Once the device operator has signed in, the display 900 of FIG. 9 may be presented to the device operator. The display 900 is similar to the display 700 in that it includes buttons 704-712, but reflects the device operator and/or member through person indicator 902 and enables the device operator to sign out of the account through sign out link 904.

Figure 10:
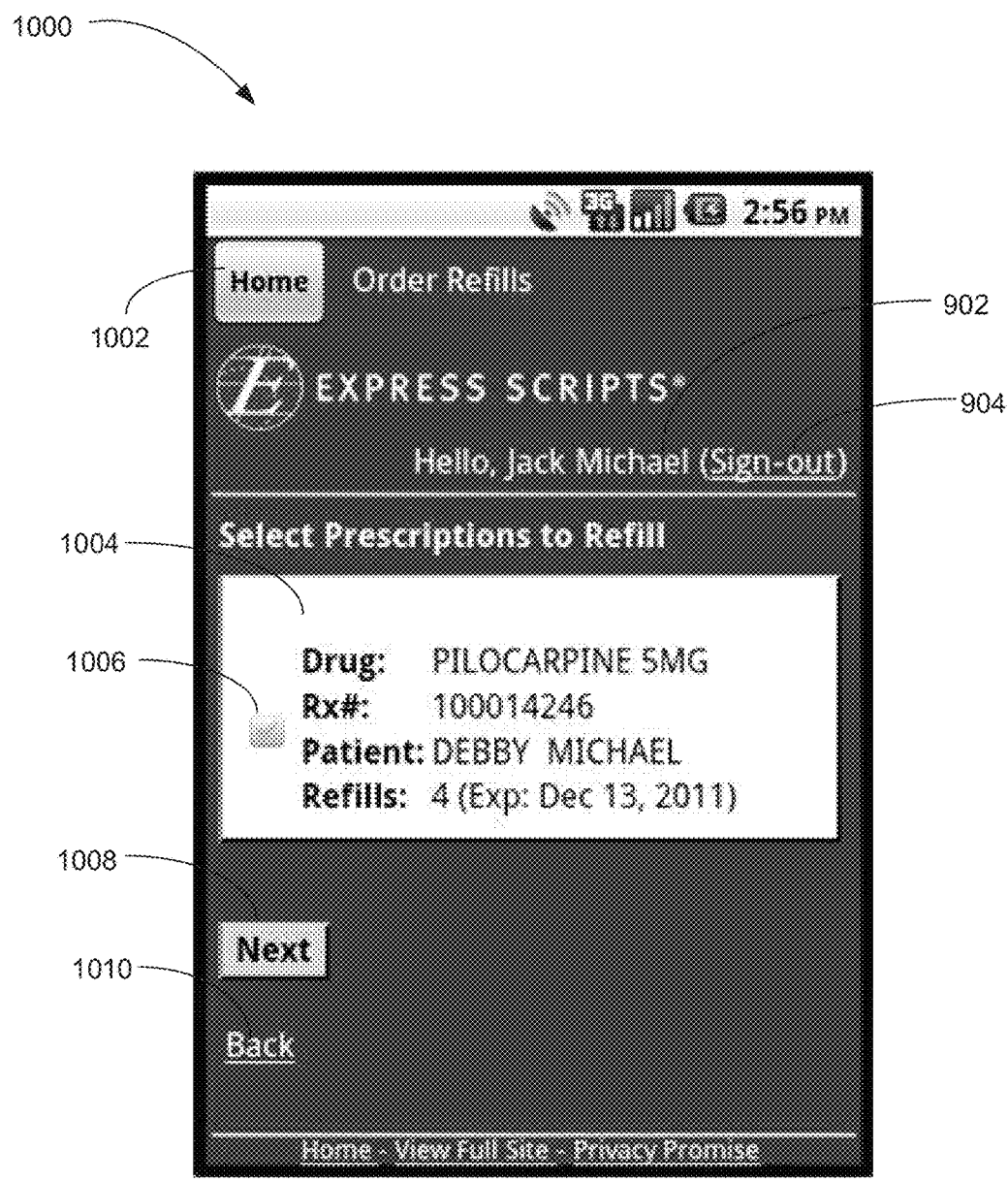

When the device operator selects an order refill button 704, the display 1000 of FIG. 10 may be presented to the device operator. The display 1000 includes a home button to return the device operator to the display 900. The person indicator 902 and the sign out link 904 are also present in the display 1000.

A refill prescription drug listing 1004 may be included in the display 1000. While a single prescription drug is included on the refill prescription drug listing 1004, multiple prescription drugs may be included when available for refill selection. While the example prescription drug is identified by drug name, RX number, patient name, number of refills, and expiration date of refills, more or less information may be provided. When available for refill selection, the device operator may select a checkbox 1006 to select a prescription drug from the refill prescription drug listing 1004 for refill. Upon completion the device operator can process the request by selecting a next button 1008 or can return to the display 900 without processing the request by selecting a back link 1010.

Figure 11:
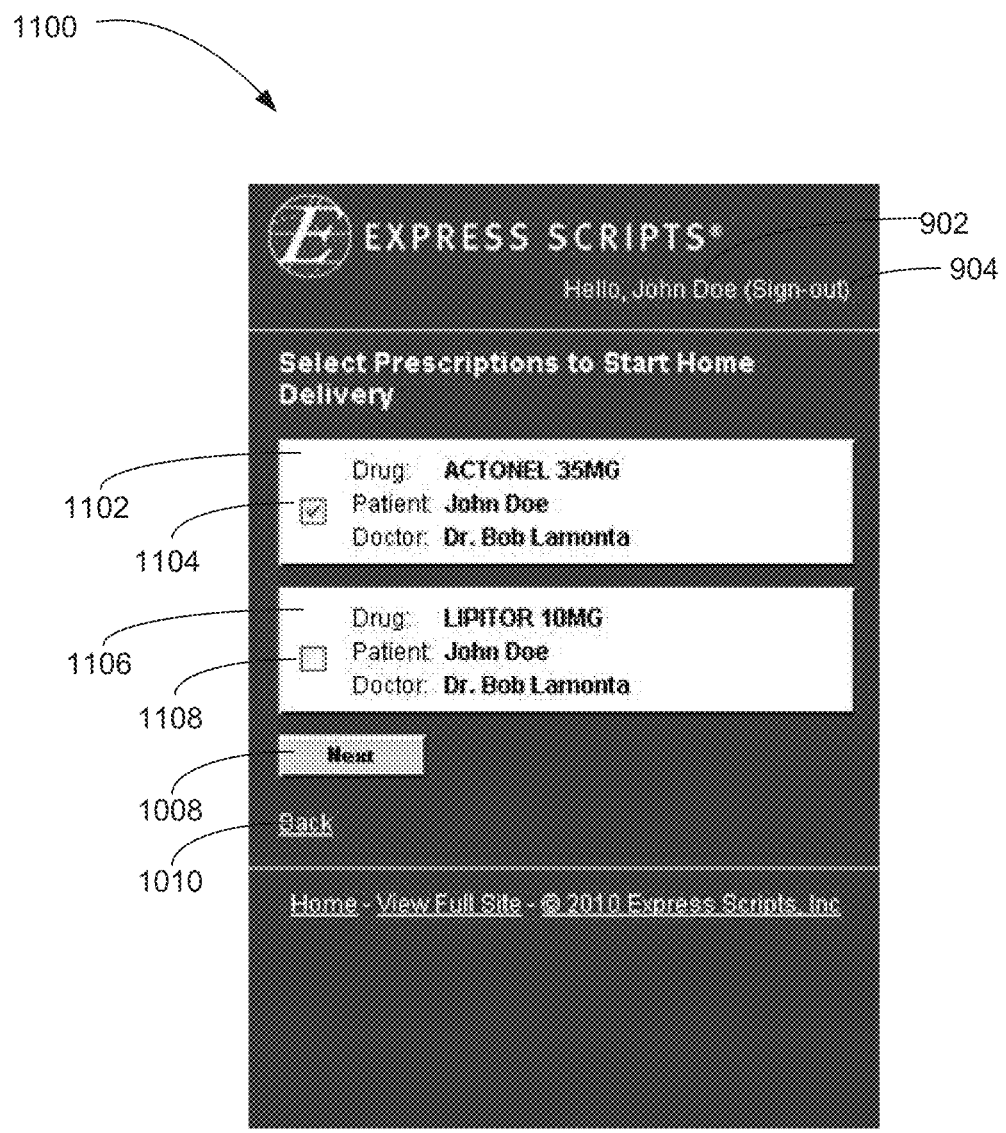

When the device operator selects a start home delivery button 706, the display 1100 of FIG. 11 may be presented to the device operator. The display 1100 includes the person indicator 902 and the sign out link 904.

A home delivery prescription drug listing may be included in the display 1100. While multiple prescription drugs 1102, 1106 are included on the home delivery prescription drug listing, a single prescription drug may be included when available for starting home delivery. While the example prescription drug is identified by drug name, dosage amount, patient name, and doctor name, more or less information may be provided. When available for starting home delivery selection, the device operator may select a checkbox 1104, 1108 to select a prescription drug from the home delivery prescription drug listing. In some embodiments, all prescription drugs are listed on the home delivery prescription drug listing. In other embodiments, only prescription drugs that are available for home delivery (e.g., maintenance drugs) are listed on the home delivery prescription drug listing. Upon completion of selections, the device operator can process the request by selecting a next button 1008 or can return to the display 900 without processing the request by selecting a back link 1010.

Figure 12:
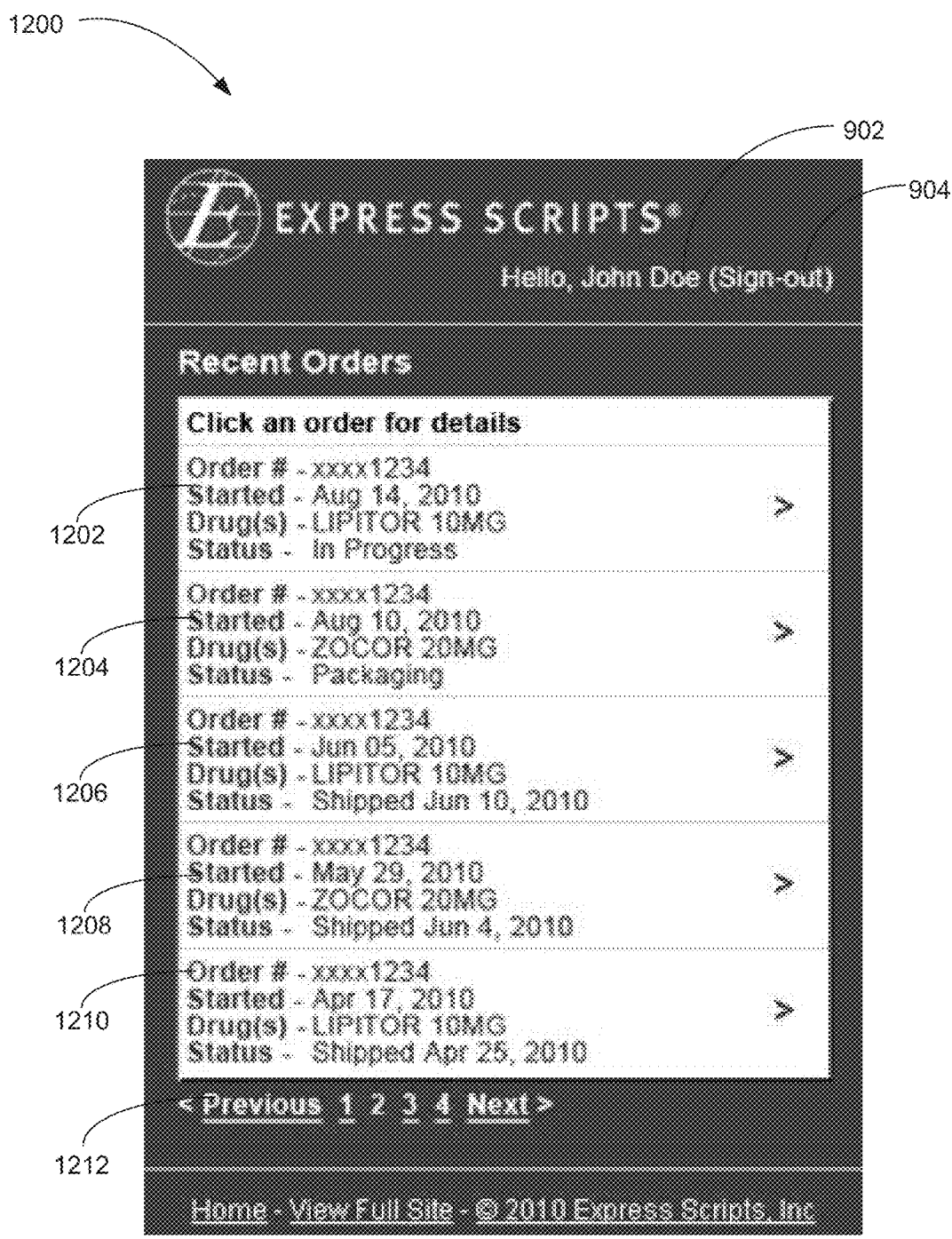

When the device operator selects a check order status button 708, the display 1200 of FIG. 12 may be presented to the device operator. The display 1200 includes the person indicator 902 and the sign out link 904.

A prescription drug order listing may be included in the display 1200. While multiple prescription drugs 1202-1210 are included on the prescription drug order listing, a single prescription drug may be included on the prescription drug order listing. While the example prescription drug is identified by order number, start date, drug name, dosage amount, and status, more or less information may be provided. When available for reviewing order history of a particular prescription drug, the device operator may select the prescription drug itself to obtain additional information regarding the selected prescription drug. In some embodiments, the shipping method may be included on the prescription drug order listing. In some embodiments, the shipping method may be included within the additional information. The device operator may navigate through several displays or pages of prescription order history when available through navigation controls 1212.

While five prescription drugs are shown on the display 1200, a greater or lesser number of prescription drugs may be shown. In addition, all previously ordered prescription drugs may be shown in the display 1200, or only those prescription drugs from a certain time period (e.g., the last six months).

Figure 13:
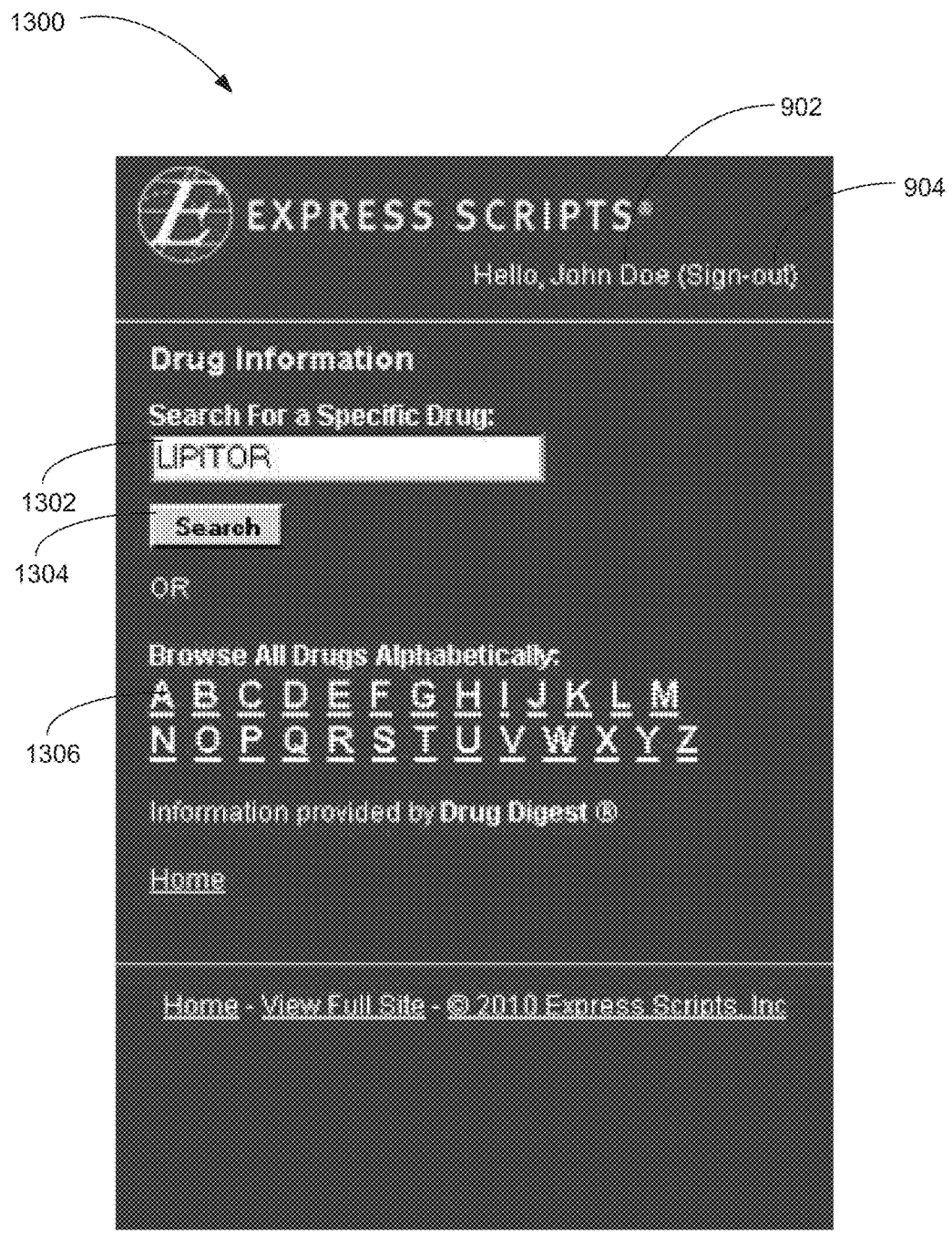

When the device operator selects a drug information button 712, the display 1300 of FIG. 13 may be presented to the device operator. The display 1300 includes the person indicator 902 and the sign out link 904.

The display 1300 includes a search field 1302 by which the device operator can search on a drug name. When a search button 1304 is selected, a search may be performed for a prescription drug matching the name included in the search field 1302. In addition, the device operator can browse by prescription drug name alphabetically through drug navigation 1306. The provided information on prescription drugs may be information included within the DRUGDIGEST database.

Figure 14:
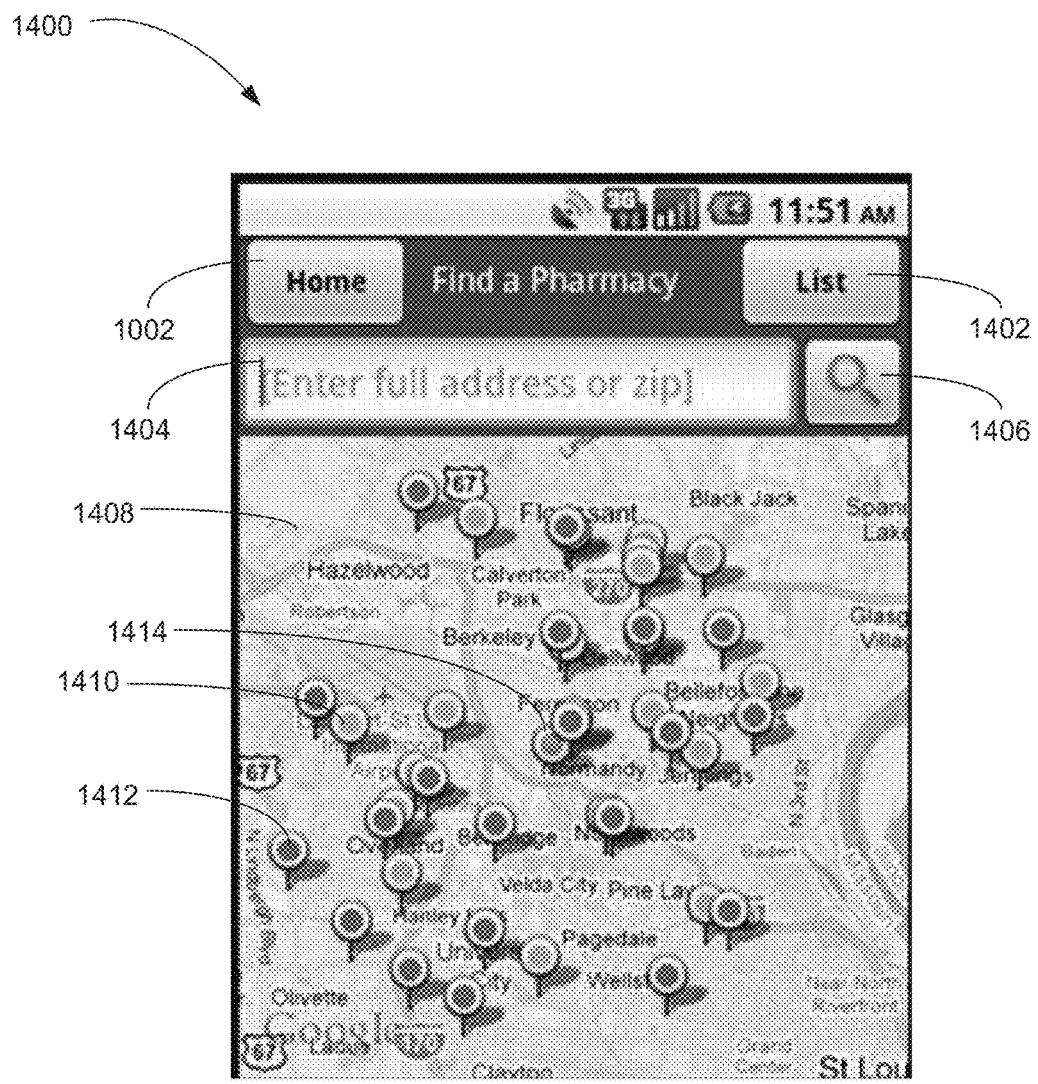

When the device operator selects a find a pharmacy button 710, the display 1400 of FIG. 14 may be presented to the device operator. As shown, the default display presented to the device operator through display 1400 includes a map. The device operator can select to see a pharmacy list by selection of a list button 1402. However, by default a display including a list could be shown to the device operator by default.

In addition to the home button 1002, the display 1400 also includes a search field 1404 and a search button 1406. While by default the display 1400 includes a map 1408 based around a location associated with the device operator, by including an address zip code into the search field 1404 and selecting the search button 1406 the map 1408 may be based around a different area.

As shown, the map 1408 includes a number of preferred pharmacy locations designated by indicators 1410 including a first color (e.g., green). The map 1408 also includes a number of non-preferred pharmacy locations designated by indicators 1412 including a second, different color (e.g., red). The location of the device operator is identified by a current location indicator 1414 in a third color (e.g., blue).

In some embodiments, helpful text may be included in the display 1400. For example, the helpful text may reflect that certain indicators (e.g., green indicators) represent preferred pharmacies while other indicators (e.g., red indicators) are for non-preferred pharmacies.

Figure 15:
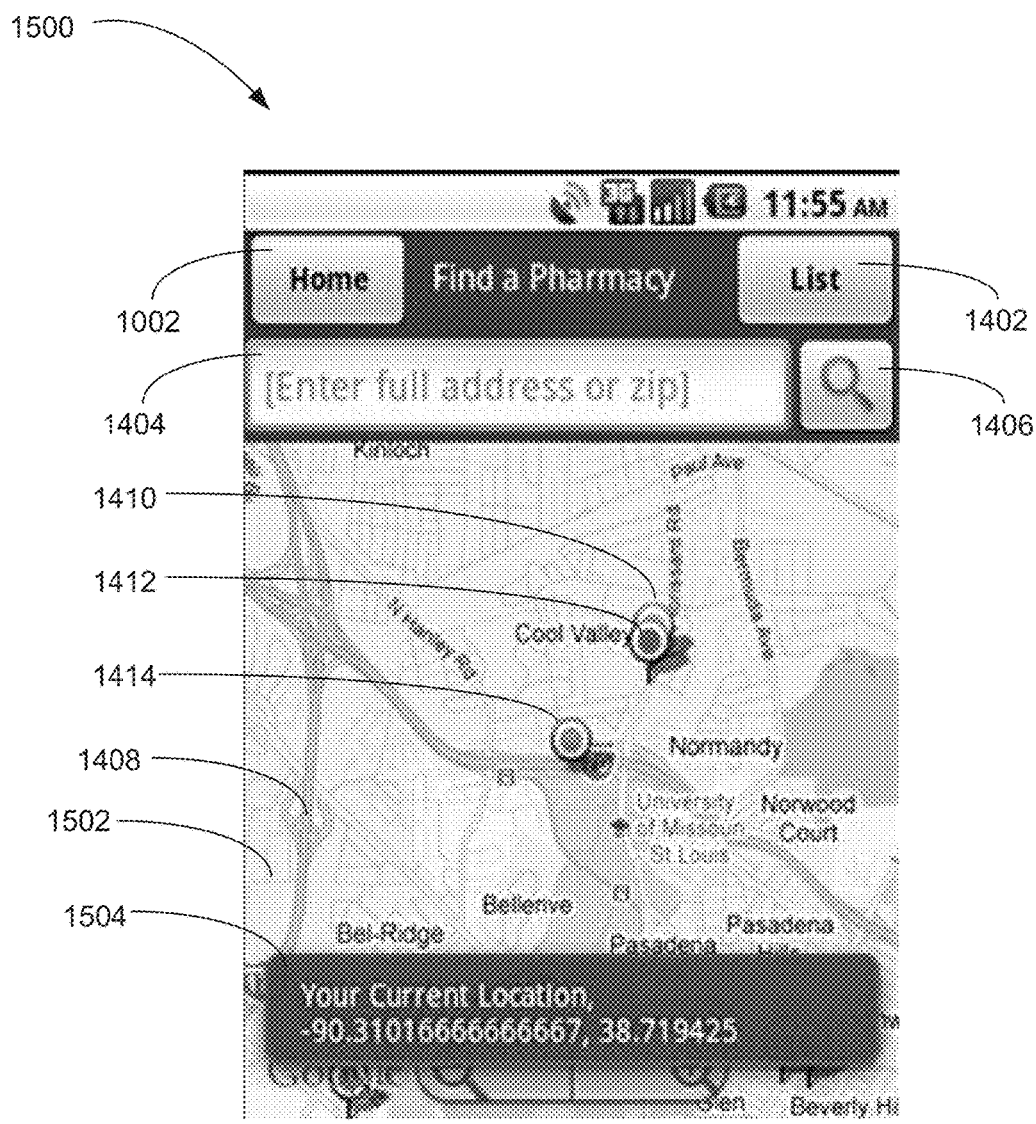

The display 1500 of FIG. 15 shows a map 1502 that is a zoomed in version of the map 1408. The display 1500 may be presented when the device operator selections the current location indicator 1414 or another area of the map 1400. A current location 1504 of the device operator may also be presented on the display 1500. While the current location is shown as a latitude and longitude, other indications of current location may be used.

Figure 16:
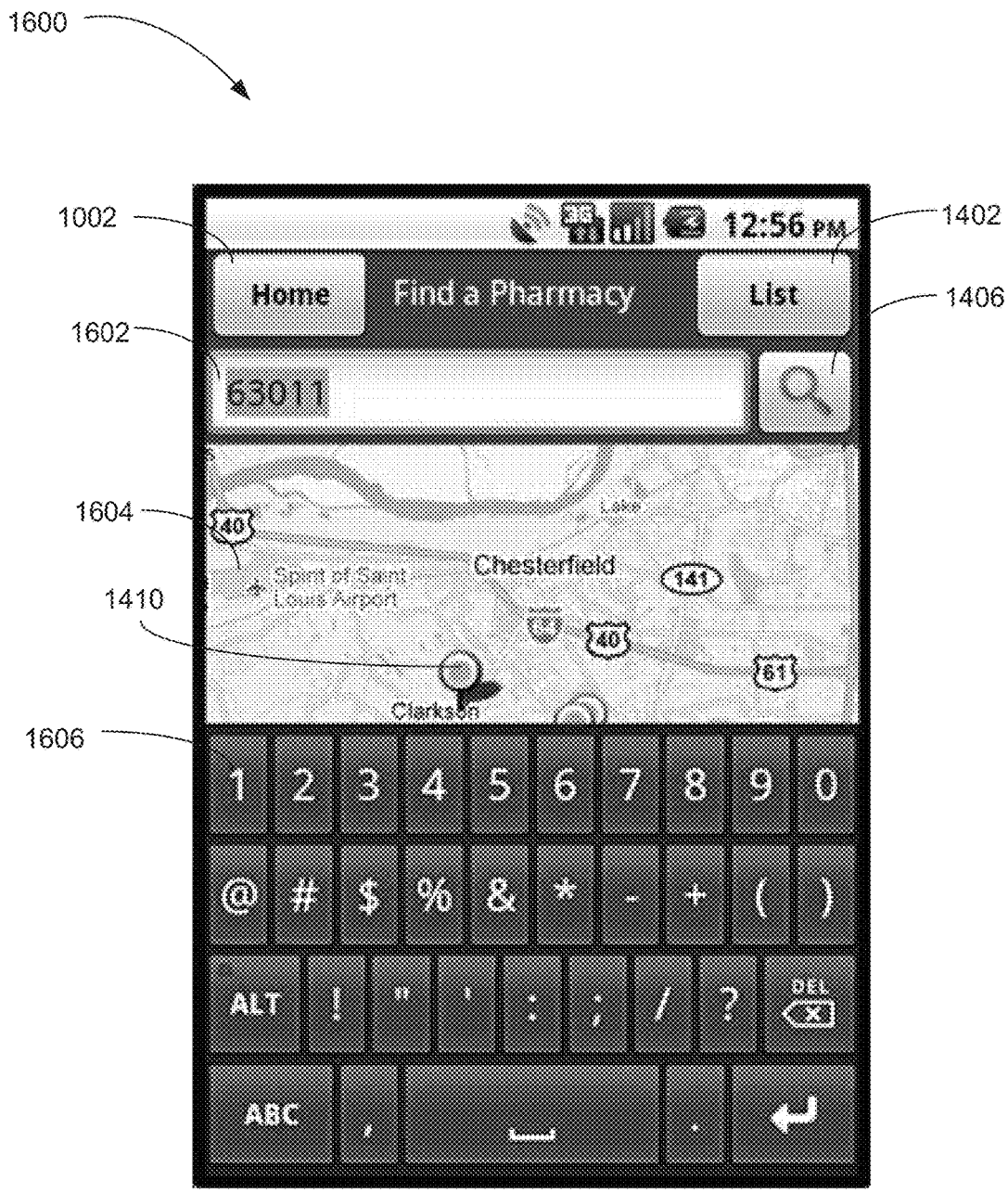

When the user types in a zip code, address, or other geographic identifier into the search field 1404 and selects a search button 1406, the indicator may be reflected in a completed search field 1602 as shown in the display 1600 of FIG. 16. A new pharmacy location search is performed and a map 1604 may then be generated based on the geographic identifier input into the completed search field 1602. An electronic typing pad 1606 may be included on the display 1600 to enable the user to enter data in the search field 1404 to obtain the completed search field 1602.

Figure 17:
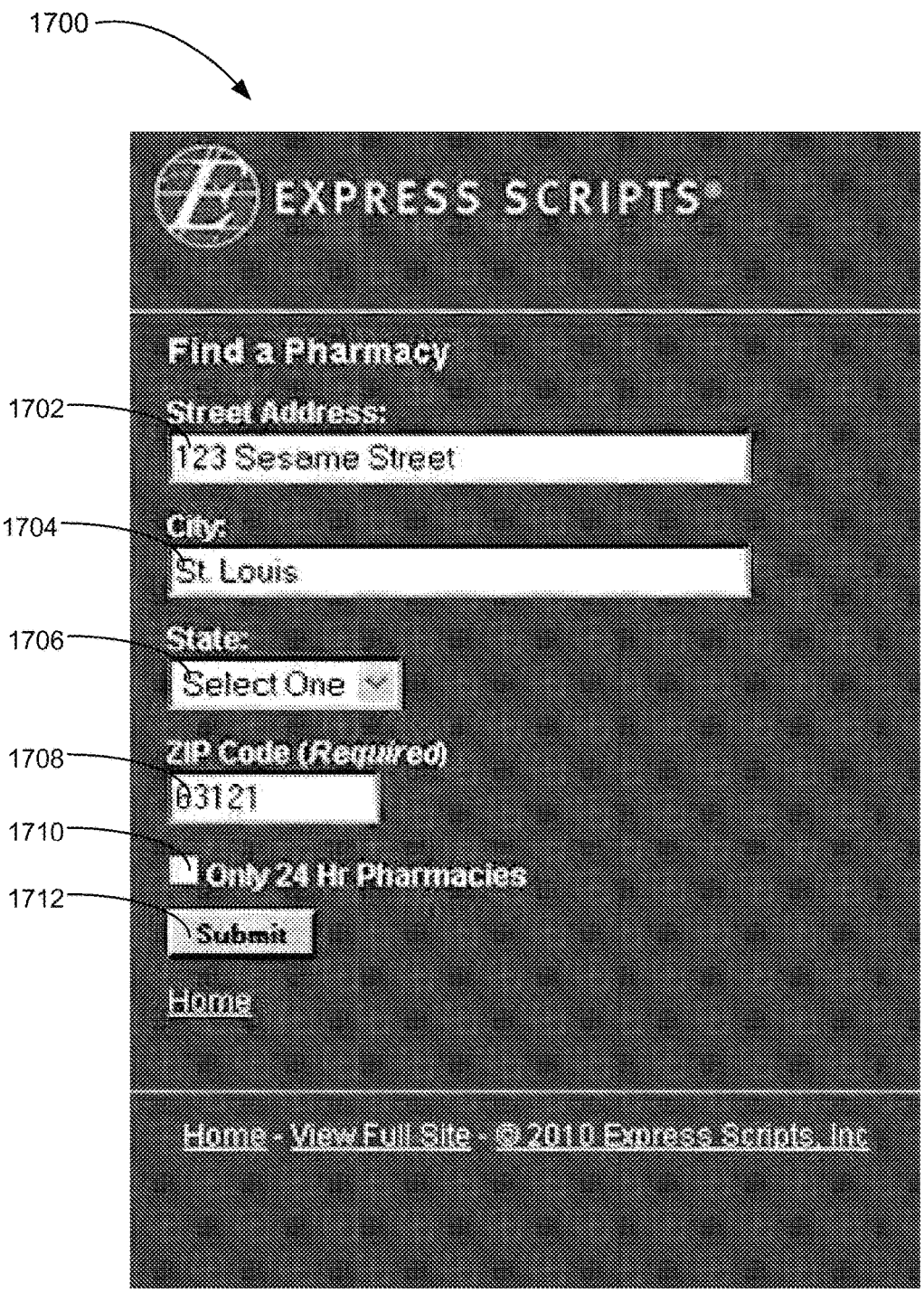

As a different default screen when the find a pharmacy button 710 is selected, when the search button 1406 is selected without a geographic indicator in the search field 1404, or otherwise, a display 1700 as shown in FIG. 17 may be presented. The display 1700 includes a number of fields 1702-1708 to locate a pharmacy near a particular location. A street address field 1702 receives a street, a city field 1704 receives a city, a state field 1706 enables the device operator to select a state, and a zip code field 1708 receives a zip code. The device operator may select to only identify the location of twenty-four hour pharmacies by use of a checkbox 1710. Once at least some of the various fields 1702-1708 and, if desired, the check box 1712 are completed, the device operator may select a submit button 1712. The resulting display may be similar to the display 1400 or the display 1600 (with or without the electronic typing pad 1606) depending on whether the map reflects the current location of the device operator.

In some embodiments, an additional field may be included on the display 1800 or another display) that enables the device operator to search or view all pharmacies in the pharmacy network, only preferred pharmacies in the pharmacy network, only non-preferred pharmacies in the pharmacy network, or otherwise change the search or viewing criteria.

Figure 18:
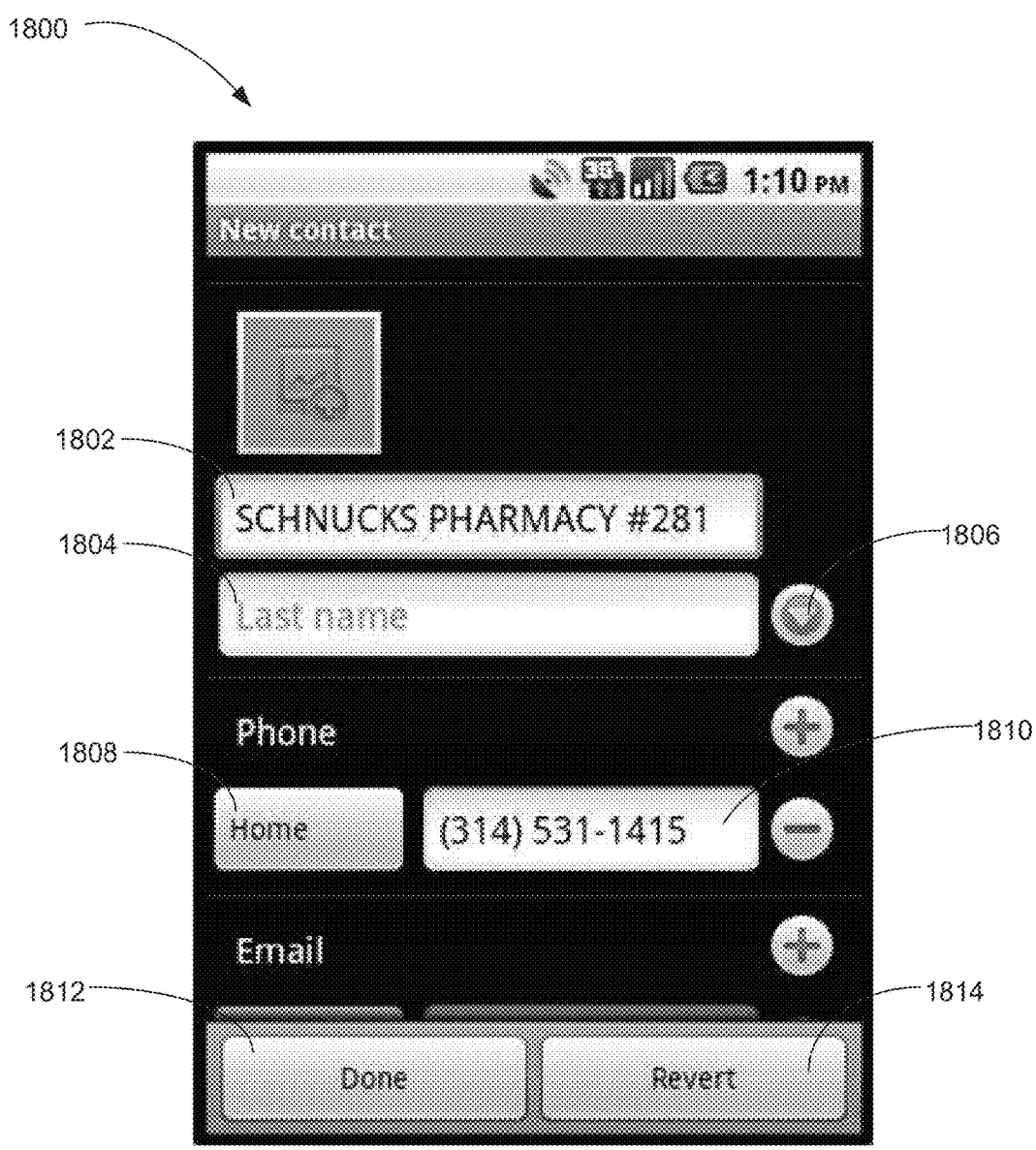

When the device operator selects a pharmacy from one of the various displays 1400-1600, the display 1800 of FIG. 18 may be presented to the device operator. The display 1800 may enable the device operator to view additional details regarding a selected pharmacy and/or add contact information regarding a selected pharmacy to contact data of the device operator. As shown, the display 1800 populates pharmacy name in a first name field 1802 and includes a blank field in a last name field 1804. A variety of navigation controls 1806 are shown and may be used in conjunction with the fields 1802, 1804, 1810. A phone type identifier 1808 may indicate type of the phone number for the contact (e.g., home, work, mobile, or facsimile) while a telephone number field 1810 may be populated with the telephone number of the pharmacy. The name of the pharmacy and the telephone number of the pharmacy may be populated from the pharmacy data 116. In addition, e-mail address may be stored in an e-mail address field (not shown). The address of the pharmacy may be populated in an address field (not shown).

If the device operator wishes to save the information into contact information, the device operator may select a done button 1812. If the device operator does not wish to save the information, the device operator may select a revert button 1814. If the pharmacy location is already saved within the contacts of the device operator, the contact information as saved in the device operator's contact list may instead be loaded.

Figure 19:
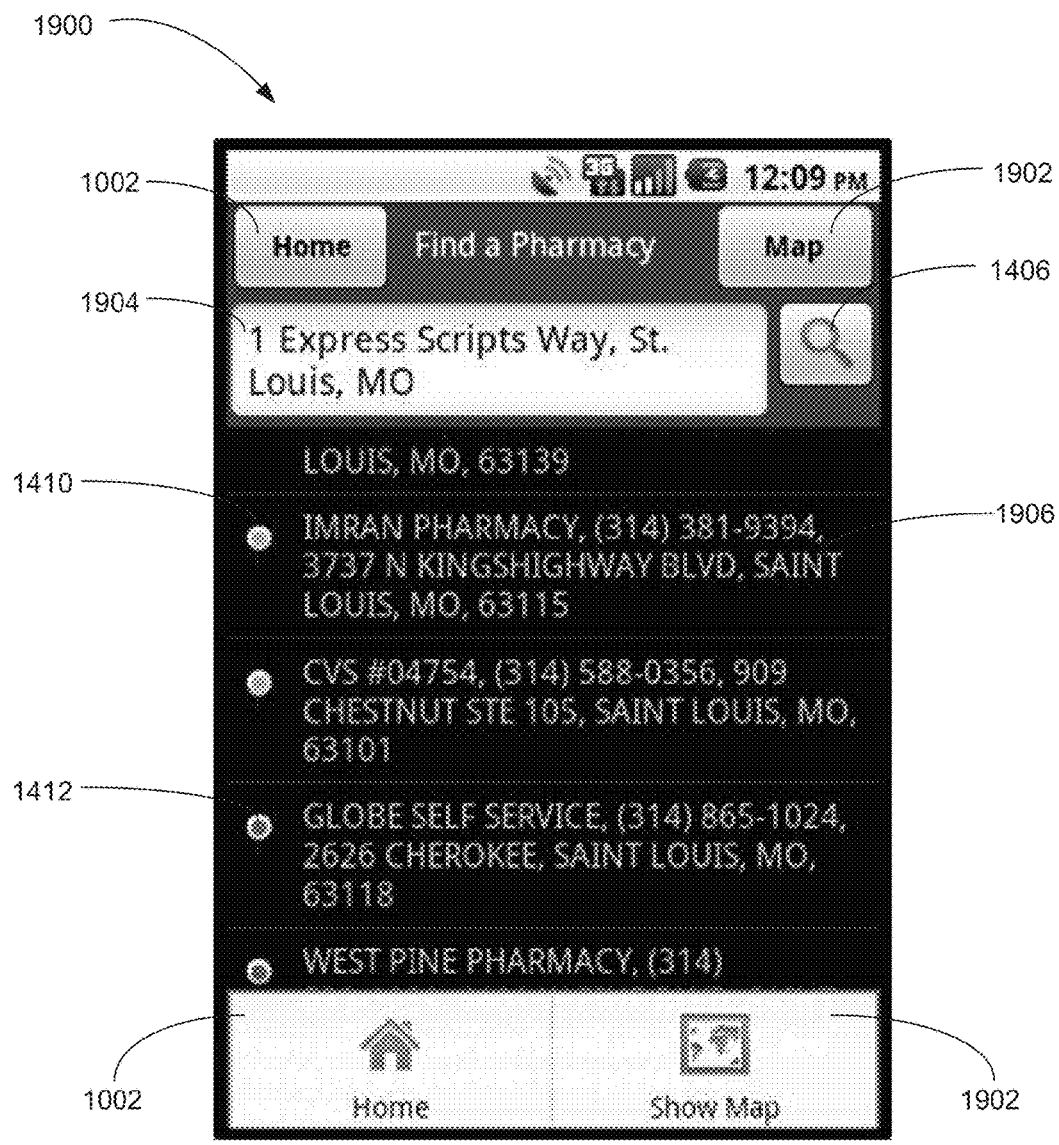

When the list button 1402 is selected in the displays 1400-1600, or by default when the find a pharmacy button 710 is selected in the display 900, the display 1900 of FIG. 19 may be presented. The display 1900 is an example display that includes a pharmacy list.

As shown in the display 1900, the home button 1002 has the functionality described above and a map button 1902 may generate or revert to a map for the data associated with the pharmacy list. Examples of these displays include the displays 1400-1600.

An entered address or a current address of the device operator may be entered or populated into an address field 1904. The device operator may search on the address contained in the address field 1904 by selecting search button 1406 as per above.

The display 1900 includes a pharmacy list 1906. The pharmacies included on the pharmacy list 1906 include pharmacy name, pharmacy telephone number, and pharmacy address. However, more or less pharmacy information may also be included. In this example pharmacy list, indicators 1410, 1412 reflect pharmacies that are preferred pharmacies and non-preferred pharmacies respectively. Selecting a pharmacy from the pharmacy list may enable the device operator to view additional details regarding the pharmacy and/or add the pharmacy to the contact list of the device operator.

Figure 20:

The display 2000 of FIG. 20 is another example of a pharmacy list. A pharmacy list 2002 includes a listing of pharmacies that include pharmacy name and pharmacy address only. However, as per above, more or less information may be included. In this example, indicators are not included to indicate preferred pharmacies and non-preferred pharmacies. The pharmacies may be ordered strictly by proximity to the device operator, or may be first ordered by preferred pharmacies within proximity with closest pharmacy highest on the list and then non-preferred pharmacies similarly sorted.

An identify location button 2004 may be used to include on the display 2000 or on a different display a current location of the device operator. The device operator may switch between a map (not shown) or the pharmacy list 2002 by selection of a map button 2006 or a list button 2008 respectively. The buttons 2006, 2008 also reflect whether the map or the pharmacy list is reflected.

While a number of different types of user interface elements have been reflected above, other types of user interface elements may be used to perform the same or similar functionality.

Figure 21:
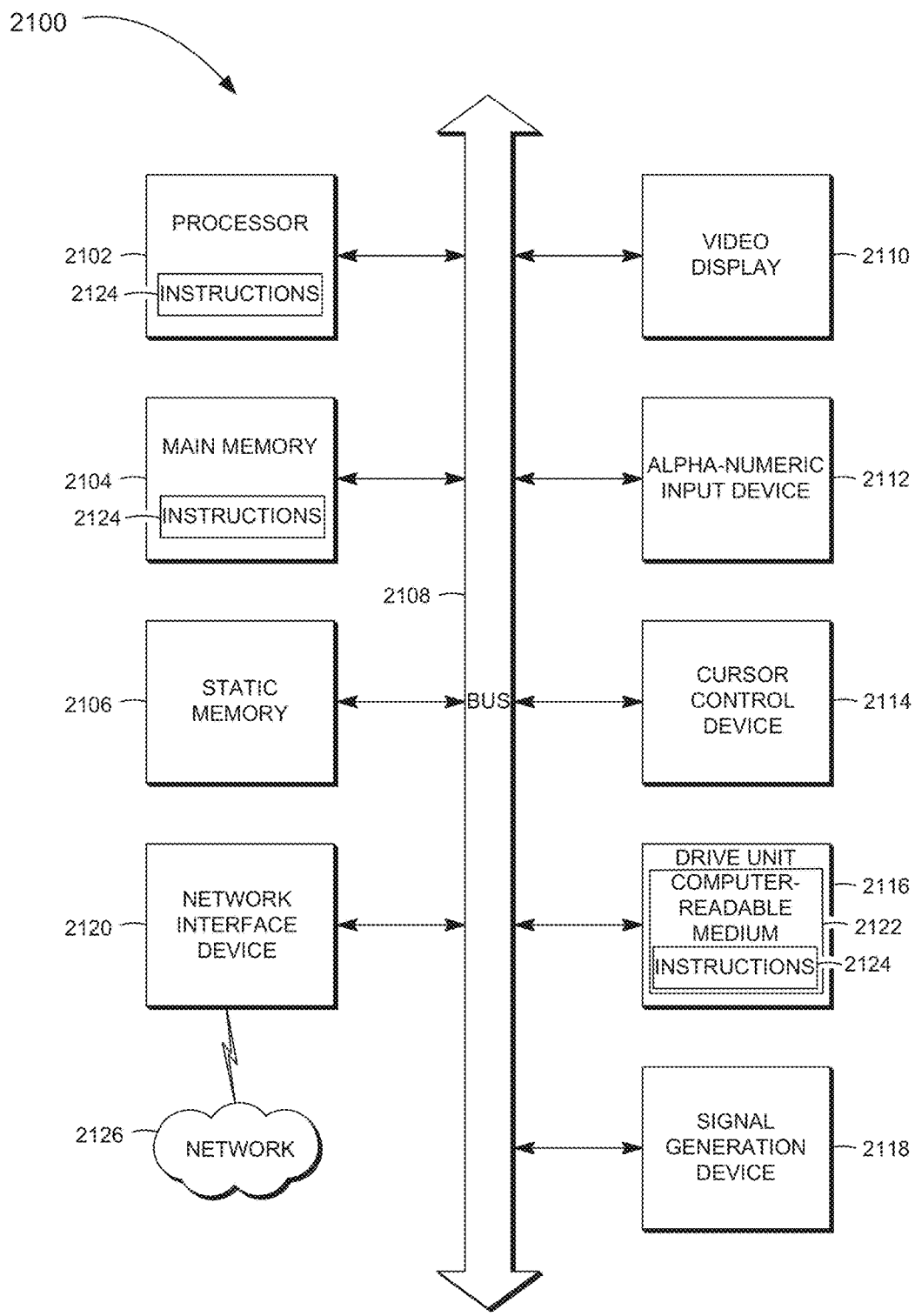
FIG. 21 is a block diagram of a machine in the example form of a computer system within which a set of instructions for causing the machine to perform any one or more of the methodologies discussed herein may be executed or stored.

FIG. 21 shows a block diagram of a machine in the example form of a computer system 2100 within which a set of instructions may be executed causing the machine to perform any one or more of the methods, processes, operations, or methodologies discussed herein. The mobile electronic device 102, the network manager device 106, and/or the application provider device 108 may include the functionality of the one or more computer systems 2100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU) a graphics processing unit (GPU) or both), a main memory 2104 and a static memory 2106, which communicate with each other via a bus 2108. The computer system 2100 further includes a video display unit 1210 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a drive unit 2116, a signal generation device 2118 (e.g., a speaker) and a network interface device 2120.

The drive unit 2116 includes a computer-readable medium 2122 on which is stored one or more sets of instructions (e.g., software 2124) embodying any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting computer-readable media.

The software 2124 may further be transmitted or received over a network 2126 via the network interface device 2120.

While the computer-readable medium 2122 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a plurality of pharmacy network associations of a member is determined. The pharmacy network associations are associated with a drug benefit plan of the member. A pharmacy within a pharmacy network association of the plurality of pharmacy network associations is capable of fulfilling a prescription for a prescription drug. A location associated with the member is accessed. A display is generated based on the determination of the pharmacy network associations and the location of the member. The display includes a first indicator and a second indicator. A first network pharmacy of a first pharmacy network association is associated with the first indicator on the display. A second network pharmacy of a second pharmacy network association is associated with the second indicator on the display.

In an example embodiment, identification of a plurality of pharmacy network associations of a member is received. The plurality of pharmacy network associations is associated with a drug benefit plan of the member. A location of the member is determined. A display is generated based on receipt of the identification of the plurality of pharmacy network associations and the location of the member. The display includes a first indicator and a second indicator. A first network pharmacy of a first pharmacy network association is associated with the first indicator on the display. A second network pharmacy of a second pharmacy network association is associated with the second indicator on the display. The first indicator is a different indicator than the second indicator.

In an example embodiment, a plurality of pharmacy network associations of a member is determined. The plurality of pharmacy network associations is associated with a drug benefit plan of the member. A pharmacy within a pharmacy network association of the plurality of pharmacy network associations is capable of fulfilling a prescription for a prescription drug. A location of the member is accessed. A pharmacy network display criterion is accessed. A pharmacy list is generated based on the location of the member. A display including the pharmacy list is generated based on the determination of the plurality of pharmacy network associations and the location of the member, the pharmacy list including a first network pharmacy of a first pharmacy network association and a second network pharmacy of a second pharmacy network association.

In some embodiments, locations beyond pharmacy locations and networks beyond pharmacy network may be used. In these embodiments, other types of networks with associated locations may be used. For example, one network could include a union network with union related business (e.g., a business that hires union employees) identified and another network could include a non-union network with both union and nonunion related businesses. The businesses identified in a business listing would then include preferred businesses that are union businesses and non-preferred business that are not union businesses.

Thus, methods and systems for pharmacy location have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
receiving, on a processor of a network manager device over the Internet, identification of a member from a mobile electronic device;
identifying, on the processor of the network manager device, a client associated with the member, the client providing a drug benefit plan under which the member receives a prescription drug benefit;
determining, on the processor of the network manager device, a plurality of pharmacy network associations available to the member based on the drug benefit plan of the member, a first pharmacy network association of the plurality of pharmacy network associations including a plurality of first network pharmacies having a first contractually obligated discounted rate on prescription drugs, a second pharmacy network association of the plurality of pharmacy network associations including a plurality of second network pharmacies having a second contractually obligated discounted rate on prescription drugs, the second discounted rate on prescription drugs being a lesser discounted rate than the first discounted rate on prescription drugs, a pharmacy within the first pharmacy network association or the second pharmacy network association being capable of fulfilling a prescription for a prescription drug;
determining, on the processor of the network manager device over the Internet, a location associated with the member from a location module of the mobile electronic device by receiving global positioning system ("GPS") coordinates of the mobile electronic device from the location module;
identifying, on the processor of the network manager device, a first network pharmacy of the first pharmacy network association offering the first discounted rate on prescription drugs based on the location associated with the member;
identifying, on the processor of the network manager device, a second network pharmacy of the second pharmacy network association offering the second discounted rate on prescription drugs based on the location associated with the member;
transmitting the identifications of the first network pharmacy and the second network pharmacy to the mobile electronic device from the network manager device over the Internet; and
causing the mobile electronic device to generate and output a display based on the identification of the first network pharmacy and the second network pharmacy and the location of the member, the display including a listing of pharmacies within a geographic area based on the location associated with the member, a first color indicator, and a second color indicator,
wherein the first network pharmacy is associated on the listing of pharmacies with the first color indicator, and the second network pharmacy is associated on the listing of pharmacies with the second color indicator, the first indicator being a different color than the second indicator.

2. The method of claim 1, further comprising:
determining the drug benefit plan associated with the member, wherein the determination of the plurality of pharmacy network associations available to the member is based on the determination of the drug benefit plan associated with the member.

3. The method of claim 1, further comprising:
receiving pharmacy data, the pharmacy data including location data regarding the plurality of pharmacy network associations,
wherein generation of the display is based on at least a part of the pharmacy data, the identification of the first network pharmacy and the second network pharmacy, and the location of the member.

4. The method of claim 3, further comprising:
transmitting a pharmacy network association request, the pharmacy network association request based on the plurality of pharmacy network associations,
wherein receipt of the pharmacy data is in response to transmission of the pharmacy network association request.

5. The method of claim 3, further comprising:
transmitting a pharmacy network association request, the pharmacy network association request based on the identification of the first network pharmacy and the second network pharmacy and the location of the member,
wherein receipt of the pharmacy data is in response to transmission of the pharmacy network association request.

6. The method of claim 1, wherein the first pharmacy network is a preferred pharmacy network of the plurality of pharmacy network associations and the second pharmacy network is a non-preferred pharmacy network of the pharmacy network associations.

7. The method of claim 1, further comprising:
accessing a pharmacy network display criterion,
wherein generation of the display is based on the pharmacy network display criterion, the identification of the first network pharmacy and the second network pharmacy, and the location of the member.

8. The method of claim 7, wherein the pharmacy network display criterion includes identification of a plurality of pharmacy benefit manager (PBM) preferred pharmacies, a plurality of PBM non-preferred pharmacies, a PBM preferred pharmacy organization, a PBM non-preferred pharmacy organization, or combinations thereof.

9. The method of claim 7, wherein the pharmacy network display criterion includes identification of a plurality of client preferred pharmacies, a plurality of client non-preferred pharmacies, a client preferred pharmacy organization, a client non-preferred pharmacy organization, or combinations thereof.

10. The method of claim 7, wherein the pharmacy network display criterion includes a distance rule, the distance rule defining a pharmacy existence guarantee between the location and the first network pharmacy.

11. The method of claim 1, wherein the determined location of the member comprises a last known location of the mobile electronic device received from the GPS.

12. A method comprising:
receiving an input on a mobile electronic device, the input including identification of a member;
identifying, on a processor of the mobile electronic device, a client associated with the member, the client providing a drug benefit plan under which the member receives a prescription drug benefit;
transmitting a request, from the mobile electronic device to a network manager device over the Internet, for a pharmacy network association identification of the member;
receiving, on the processor of the mobile electronic device from the network manager device over the Internet, identification of a plurality of pharmacy network associations available to the member based on the drug benefit plan of the member, a first pharmacy network association of the plurality of pharmacy network associations including a plurality of first network pharmacies having a first contractually obligated discounted rate on prescription drugs, a second pharmacy network association of the plurality of pharmacy network associations including a plurality of second network pharmacies having a second contractually obligated discounted rate on prescription drugs, the second discounted rate on prescription drugs being a lesser discounted rate than the first discounted rate on prescription drugs, a pharmacy within the first pharmacy network association or the second pharmacy network association being capable of fulfilling a prescription for a prescription drug;
determining a location associated with the member by receiving a travel route associated with the mobile electronic device;
identifying, on the processor of the mobile electronic device, a first network pharmacy of the first pharmacy network association offering the first discounted rate on prescription drugs based on the location associated with the member;
identifying, on the processor of the mobile electronic device, a second network pharmacy of the second pharmacy network association offering the second discounted rate on prescription drugs based on the location associated with the member; and
generating, on the processor of the mobile electronic device, a display based on the identification of the first network pharmacy and the second network pharmacy and the location of the member, the display including a listing of pharmacies within a geographic area based on the location associated with the member, a first color indicator, and a second color indicator,
wherein the first network pharmacy is associated on the listing of pharmacies with the first color indicator, and the second network pharmacy is associated on the listing of pharmacies with the second color indicator, the first indicator being a different color than the second indicator.

13. The method of claim 12, further comprising:
transmitting a pharmacy network association identification request to the network manager; device,
wherein receipt of the identification of the first network pharmacy and the second network pharmacy is in response to transmission of the pharmacy network association identification request.

14. A non-transitory machine-readable medium comprising instructions, which when executed by one or more processors, cause the one or more processors to perform the following operations:
receive, on a processor of a network manager device over the Internet, identification of a member from a mobile electronic device
identify, on the processor of a network manager device, a client associated with the member, the client providing a drug benefit plan under which the member receives a prescription drug benefit;

determine, on the processor of a network manager device, a plurality of pharmacy network associations available to the member based on the drug benefit plan of the member, a first pharmacy network association of the plurality of pharmacy network associations including a plurality of first network pharmacies having a first contractually obligated discounted rate on prescription drugs, a second pharmacy network association of the plurality of pharmacy network associations including a plurality of second network pharmacies having a second contractually obligated discounted rate on prescription drugs, the second discounted rate on prescription drugs being a lesser discounted rate than the first discounted rate on prescription drugs, a pharmacy within the first pharmacy network association or the second pharmacy network association being capable of fulfilling a prescription for a prescription drug;

determine, on the processor of the network manager device over the Internet, a location associated with the member by accessing member data in a database, the member data indicating a perceived location of the member;

identify, on the processor of the network manager device, a first network pharmacy of the first pharmacy network association offering the first discounted rate on prescription drugs based on the location associated with the member;

identify, on the processor of the network manager device, a second network pharmacy of the second pharmacy network association offering the second discounted rate on prescription drugs based on the location associated with the member;

transmit the identifications of the first network pharmacy and the second network pharmacy to the mobile electronic device from the network manager device over the Internet; and cause the mobile electronic device to generate and output a display based on the identification of the first network pharmacy and the second network pharmacy and the location of the member, the display including a listing of pharmacies within a geographic area based on the location associated with the member, a first color indicator, and a second color indicator, wherein the first network pharmacy is associated on the listing of pharmacies with the first color indicator, and the second network pharmacy is associated on the listing of pharmacies with the second color indicator, the first indicator being a different color than the second indicator.

15. A system comprising:
a global positioning system ("GPS") in a mobile electronic device that determines GPS coordinates associated with the mobile electronic device, the GPS coordinates indicating a location associated with a member; and a processor of a network manager device configured to (a) receive, over the Internet, identification of the member from the mobile electronic device, (b) identify a client associated with the member, the client providing a drug benefit plan under which the member receives a prescription drug benefit, (c) determine a plurality of pharmacy network associations available to the member based on the drug benefit plan of the member, a first pharmacy network association of the plurality of pharmacy network associations including a plurality of first network pharmacies having a first contractually obligated discounted rate on prescription drugs, a second pharmacy network association of the plurality of pharmacy network associations including a plurality of second network pharmacies having a second contractually obligated discounted rate on prescription drugs, the second discounted rate on prescription drugs being a lesser discounted rate than the first discounted rate on prescription drugs, a pharmacy within the first pharmacy network association or the second pharmacy network association being capable of fulfilling a prescription for a prescription drug, (d) determine the location associated with the member by receiving the GPS coordinates from the global positioning system of the mobile electronic device, (e) identify a first network pharmacy of the first pharmacy network association offering the first discounted rate on prescription drugs based on the location associated with the member, (f) identify a second network pharmacy of the second pharmacy network association offering the second discounted rate on prescription drugs based on the location associated with the member, (g) transmit the identifications of the first network pharmacy and the second network pharmacy to the mobile electronic device from the network manager device over the Internet, and (h) cause the mobile electronic device to generate and output a display based on the identification of the first network pharmacy and the second network pharmacy and the location of the member, the display including a listing of pharmacies within a geographic area based on the location associated with the member, a first color indicator, and a second color indicator, wherein the first network pharmacy is associated on the listing of pharmacies with the first color indicator, and the second network pharmacy is associated on the listing of pharmacies with the second color indicator, the first indicator being a different color than the second indicator.

16. The system of claim 15, further comprising:
an accelerometer in the mobile electronic device, wherein the accelerometer provides data used to generate the location associated with the member.

* * * * *